US011553242B2

(12) United States Patent
Butler et al.

(10) Patent No.: US 11,553,242 B2
(45) Date of Patent: *Jan. 10, 2023

(54) VIDEO PRODUCTION SYSTEM

(71) Applicant: StoryTap Technologies Inc., Port Coquitlam (CA)

(72) Inventors: Bernadette Butler, Port Coquitlam (CA); Sean Braacx, Vancouver (CA)

(73) Assignee: StoryTap Technologies Inc., Port Coquitlam (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,682

(22) Filed: Mar. 28, 2022

(65) Prior Publication Data

US 2022/0224969 A1 Jul. 14, 2022

Related U.S. Application Data

(63) Continuation of application No. 17/215,800, filed on Mar. 29, 2021, now Pat. No. 11,303,952, which is a continuation-in-part of application No. 16/280,234, filed on Feb. 20, 2019, now Pat. No. 10,964,352.

(60) Provisional application No. 62/633,426, filed on Feb. 21, 2018.

(51) Int. Cl.
*H04N 21/433* (2011.01)
*H04N 21/431* (2011.01)
*H04N 21/488* (2011.01)
*H04N 21/475* (2011.01)

(52) U.S. Cl.
CPC ....... *H04N 21/4334* (2013.01); *H04N 21/431* (2013.01); *H04N 21/4758* (2013.01); *H04N 21/4882* (2013.01)

(58) Field of Classification Search
CPC ............ H04N 21/4334; H04N 21/431; H04N 21/4758; H04N 21/4882
See application file for complete search history.

(56) References Cited

U.S. PATENT DOCUMENTS

| 6,763,177 B1 | 7/2004 | Abe |
| 8,532,636 B2 | 9/2013 | Rao |
| 8,621,354 B2 | 12/2013 | Henderson et al. |

(Continued)

FOREIGN PATENT DOCUMENTS

CA 2813375 10/2014

OTHER PUBLICATIONS

USPTO, Non-Final Office Action dated Mar. 23, 2020 in U.S. Appl. No. 16/280,234.

(Continued)

*Primary Examiner* — Seth A Silverman
(74) *Attorney, Agent, or Firm* — Procopio, Cory, Hargreaves & Savitch LLP

(57) ABSTRACT

A system may perform operations including displaying a graphical user interface (GUI) on a display screen of a web client; displaying a first content prompt on a prompt screen comprised in the GUI, wherein the prompt screen is disposed on the GUI at least one of proximate or adjacent to a camera of the web client; recording a first video clip while displaying the first content prompt; displaying a second content prompt on the prompt screen in response to the recording the first video clip being completed; recording a second video clip while displaying the second content prompt; and/or concatenating the first video clip and the second video clip into a video.

20 Claims, 9 Drawing Sheets

(56) References Cited

U.S. PATENT DOCUMENTS

| | | |
|---|---|---|
| 9,020,325 B2 | 4/2015 | Shannon |
| 9,583,139 B2 | 2/2017 | Shannon |
| 2011/0130172 A1 | 6/2011 | Rao |
| 2012/0102410 A1 | 4/2012 | Gewecke |
| 2014/0313351 A1 | 10/2014 | Zak et al. |

OTHER PUBLICATIONS

USPTO, Final Office Action dated Aug. 5, 2020 in U.S. Appl. No. 16/280,234.

USPTO, Notice of Allowance dated Feb. 2, 2021 in U.S. Appl. No. 16/280,234.

Logitech, "Setup Guide Logitech HD Pro Webcam C920", copyright 2012, hd-pro-webcam-c920-quick-start-guide.pdf, https://www.logitech.com/assets/45920/hd-pro-webcam-c920-quick-start-guide.pdf (Year: 2012).

Mage_Machina, "Recording your Video using the Logitech Webcam Software", published: Jun. 11, 2016, youtube.com, https://www.youtube.com/watch?v=Gy1W7Juj02U (Year: 2016).

USPTO, Notice of Allowance dated Nov. 26, 2021 in U.S. Appl. No. 17/185,573.

USPTO, Notice of Allowance dated Dec. 9, 2021 in U.S. Appl. No. 17/215,800.

VIDEO PRODUCTION SYSTEM

CROSS-REFERENCE TO RELATED APPLICATIONS

This application is a Continuation of, and claims priority to and the benefit of, U.S. patent application Ser. No. 17/215,800, filed Mar. 29, 2021 and entitled "VIDEO PRODUCTION SYSTEM," which is a Continuation-in-part of, and claims priority to and the benefit of, U.S. patent application Ser. No. 16/280,234, filed on Feb. 20, 2019 and entitled "VIDEO PRODUCTION SYSTEM," now U.S. Pat. No. 10,964,352 issued on Mar. 30, 2021, which is a non-provisional of, and claims priority to and the benefit of, U.S. Provisional Application No. 62/633,426, filed on Feb. 21, 2018 and entitled "VIDEO PRODUCTION SYSTEM," which are hereby incorporated by reference herein.

FIELD

The present disclosure generally relates to a system for producing videos by recording video clips.

BACKGROUND

Creating videos for personal and/or business use may be a difficult task, including obtaining the desired content (e.g., a story). In that regard, individuals (e.g., average people unskilled in video production/editing) who record, or are captured in, a video or a video clip may be unaware of the content which they are to provide, or unfamiliar or unprepared to provide such content. Additionally, businesses may have difficulty collecting video content from individuals having high content and video quality, and/or organized to support potentially high volumes of video data.

SUMMARY

Systems and methods are disclosed relating to a video production system. In various embodiments, the system may be configured to allow a user to record multiple, separate video clips, in any desired order, and concatenate the video clips into a video comprising the video clips arranged in an appropriate order. Any or all of the video clips may be redone or re-recorded at any time. Additionally, in producing the individual video clips, the system may display one or more content prompts on a graphical user interface (GUI) to prompt the user to provide the desired information or content in each respective video clip. A content prompt may be disposed on the GUI in a location near a camera on a web client, and/or a playback screen, to allow a user to look at the content prompt and/or the playback screen while still appearing to make eye contact with the camera. In response to a video clip associated with a first content prompt being recorded, a second content prompt may be displayed in preparation and direction for recording a second video clip, and so on.

A system, method, and article of manufacture (collectively, "the system") are disclosed relating to a video production system. In various embodiments, the system may be configured to perform operations including, displaying, by a processor, a graphical user interface (GUI) on a display screen of a web client; displaying, by the processor, a first content prompt on a prompt screen comprised in the GUI, wherein the prompt screen is disposed on the GUI at least one of proximate or adjacent to a camera of the web client; recording, by the processor, a first video clip while displaying the first content prompt; displaying, by the processor, a second content prompt on the prompt screen in response to recording the first video clip being completed; recording, by the processor, a second video clip while displaying the second content prompt; and/or concatenating, by the processor, the first video clip and the second video clip into a video. In various embodiments, the displaying the second content prompt may automatically occur in response to the recording the first video clip being completed.

In various embodiments, the operations may further comprise associating, by the processor, the first video clip with the first content prompt in response to the recording the first video clip; and/or associating, by the processor, the second video clip with the second content prompt in response to the recording the second video clip. In various embodiments, the first video clip may comprise a first order marker in response to associating the first video clip with the first content prompt, and the second video clip may comprise a second order marker in response to associating the second video clip with the second content prompt, wherein the first order marker and the second order marker indicate an order in which the first video clip and the second video clip will be concatenated as part of concatenating the first video clip and the second video clip into the video. In various embodiments, the operations may further comprise receiving, by the processor, an instruction to concatenate the first video clip and the second video clip into the video; analyzing, by the processor, the first order marker and the second order marker in response to receiving the instruction to concatenate; and/or determining, by the processor, the order in which the first video clip and the second video clip will be concatenated during concatenating the first video clip and the second video clip based on analyzing the first order marker and the second order marker.

In various embodiments, the first content prompt may comprise a first order marker, and the second content prompt may comprise a second order marker, wherein the first order marker and the second order marker indicate a concatenating order in which the first video clip and the second video clip are concatenated as part of concatenating the first video clip and the second video clip into the video. In various embodiments, the operations may further comprise displaying, by the processor, a prompt guide on the GUI, wherein displaying the prompt guide comprises displaying the first content prompt and the second content prompt within the prompt guide according to a display order dictated by the first order marker and the second order marker. The prompt guide may be displayed prominently. In various embodiments, the prompt guide may be displayed on the GUI proximate an outer edge of the GUI. In various embodiments, the concatenating order may (or may not be) the same as the display order. In various embodiments, displaying the second content prompt may automatically occur in response to the recording the first video clip being completed wherein the second order marker is later in at least one of the concatenating order or the display order than the first order marker.

In various embodiments, the operations may further comprise marking, by the processor, the first content prompt displayed in the prompt guide with a first recorded marker in response to recording the first video clip being completed; and/or marking, by the processor, the second content prompt displayed in the prompt guide with a second recorded marker in response to recording the second video clip being completed. In various embodiments, displaying the second content prompt in the prompt screen may be in response to receiving, by the processor, a selection of the second content prompt displayed in the prompt guide made by a user.

In various embodiments, the operations may further comprise storing, by the processor, the first video clip in response to recording the first video clip being completed; storing, by the processor, the second video clip in response to recording the second video clip being completed; receiving, by the processor, a command to replay at least one of the first video clip and the second video clip; retrieving, by the processor, at least one of the first video clip and the second video clip; and/or replaying, by the processor, at least one of the first video clip and the second video clip on a replay screen on the GUI. In various embodiments, the operations may further comprise displaying, by the processor, a video play back screen displaying visual information captured through the camera, wherein the video playback careen is disposed in the GUI proximate at least one of the prompt screen or the camera on the web client.

A system, method, and article of manufacture (collectively, "the system") are disclosed relating to a video production system. In various embodiments, the system may be configured to perform operations including, displaying, by a processor, a graphical user interface (GUI) for recording a video on a display screen of a web client, wherein the GUI may comprise a plurality of screens, including a prompt screen; displaying, by the processor, a content prompt on the prompt screen comprised in the GUI, wherein the prompt screen may be disposed on the GUI proximate to a top of the GUI; displaying, by the processor, a video playback screen, which may be separate from the prompt screen, of the plurality of screens displaying visual information in real time captured through a camera; and/or recording, by the processor, a video clip during the displaying the content prompt, wherein the content prompt may comprise at least one of a text or an image configured to solicit at least one of a desired reaction or a desired information from a user during the recording of the video clip. In various embodiments, the operations may further comprise receiving, by the processor, an inquiry from a customer user prior to the displaying the GUI for recording a video. In various embodiments, the operations may further comprise generating, by the processor, the content prompt based on the inquiry. In various embodiments, the content prompt may be automatically generated, by the processor, based on the inquiry. In various embodiments, the operations may further comprise associating, by the processor, the inquiry with the video clip. In various embodiments, the operations may further comprise displaying, by the processor, the inquiry on a merchant GUI. In various embodiments, the operations may further comprise receiving, by the processor, a selection of the inquiry; and/or playing, by the processor, the video clip on the merchant GUI in response to the selection of the inquiry. In various embodiments, the operations may further comprise moving, by the processor, the GUI within the display screen. In various embodiments, the prompt screen may be more proximate the top of the GUI than the video playback screen. In various embodiments, the prompt screen may be disposed between the top of the GUI and the video playback screen. In various embodiments, the prompt screen may be a screen of the plurality of screens that is most proximate the top of the GUI.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any combination and/or order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
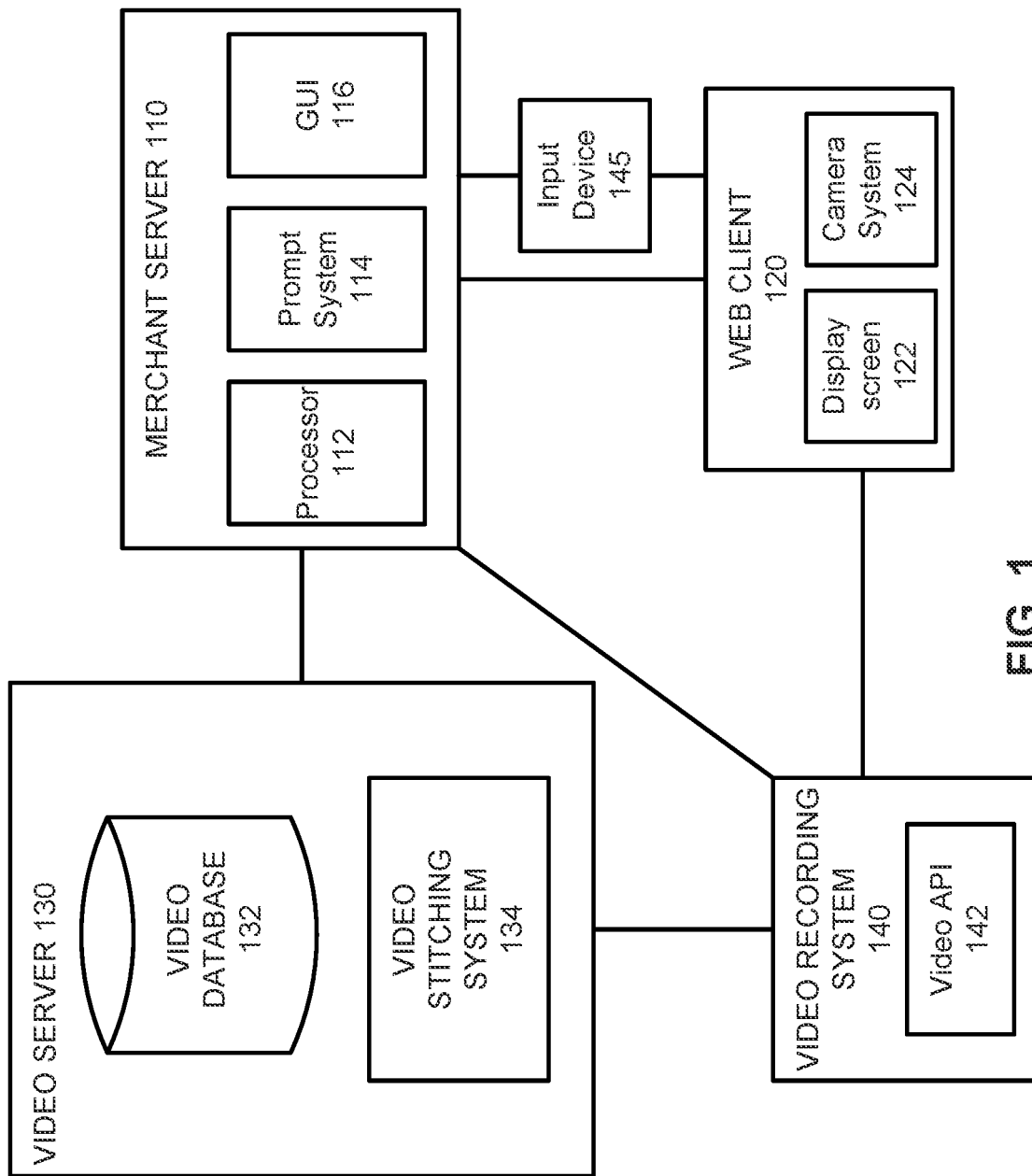
FIG. 1 illustrates an exemplary video production system, in accordance with various embodiments.

With reference to FIG. 1, an exemplary video production system 100 is illustrated, in accordance with various embodiments. System 100 may allow a user to easily and efficiently record one or more video clips comprising desired content conveyed by an individual, and then, if multiple video clips were recorded, concatenate the video clips into a video (i.e., at least a portion of a full or finished video). For example, a user may wish to create a video conveying a piece of information through a video clip. As another example, a user may wish to create a video in which the user and/or individual featured in the video discusses multiple subjects or conveys multiple pieces of information. Each subject or piece of information may have an associated content prompt provided to solicit the desired subject or information from the user during recording of the video clip. Utilizing system 100, each content prompt may be displayed to the user for each (or during the recording of each) video clip to prompt conveyance of, or extract from the user, the desired content for the respective video clip. In various embodiments, there may be multiple content prompts. The content prompts may be displayed (e.g., in a prompt guide on the GUI) to a user of system 100 in any suitable order (e.g., an order in which video clips associated with the content prompts will be concatenated into a video). One or more content prompts may be displayed before and/or during the recording of a video clip. In response to a video clip being complete, system 100 may display another content prompt in order to record a subsequent video clip soliciting different information from the user. In response to all desired video clips being created, and the user being satisfied with the video clips (and indicating the same to processor 112 by, for example, selecting a "finish" or "complete" button), system 100 may concatenate, or facilitate the concatenation of, the video clips into a video. Therefore, the user of system 100 may create a video in portions (i.e., separate video clips), which allows re-recording of video clips that are not satisfactory, while leaving undisturbed those video clips which are satisfactory. System 100 may comprise software integrated with and utilized by a web client 120 (e.g., a personal computer, smartphone, tablet, or the like).

In various embodiments, system 100 may comprise a merchant server 110, a web client 120, a video server 130, a video recording system 140, and/or an input device 145. In various embodiments, any or all of the components of system 100 may be integrated, and/or in electronic communication, with one another via one or more application programming interfaces (APIs). System 100 and/or any of the components comprised therein may be computer-based, and may comprise a processor (e.g., processor 112), a tangible non-transitory computer-readable memory, and/or a network interface. Instructions stored on the tangible non-transitory memory may allow system 100, or the components therein, to perform various functions, as described herein. In various embodiments, one or more processors (e.g., processor 112) may control, preform, and/or facilitate the functions of all components of system 100.

In various embodiments, merchant server 110 may comprise hardware and/or software capable of storing data and/or analyzing information. Merchant server 110 may comprise a server appliance running a suitable server operating system (e.g., MICROSOFT INTERNET INFORMATION SERVICES or, "IIS") and having database software (e.g., ORACLE) installed thereon. Merchant server 110 may be in electronic communication with web client 120, video server 130, video recording system 140, and/or input device 145 via a network. In various embodiments, merchant server 110 may be in electronic communication with web client 120, video server 130, and/or video recording system 140 via video API 142 provided by video recording system 140. As such, merchant server 110 may be able to communicate, and/or share information, with web client 120, video server 130, and/or video recording system 140.

In various embodiments, merchant server 110 may comprise a processor 112, a prompt system 114, and/or a graphical user interface 116 (GUI). Any of the components of merchant server 110 may be in electronic communication with one another. Processor 112 may be configured to receive inputs from the user through input device 145, perform the functions, or instruct/facilitate the performance of functions, of system 100 including, for example, video clip recording, concatenating video clips to produce a video, or the like, and/or facilitate the transfer of information between the components of system 100. As discussed, a processor (e.g., processor 112) may be comprised in any or all components of system 100 (e.g., web client 120, video server 130, and/or video recording system 140). Processor 112 may be further configured to present/display data and information (or cause data and information to be presented and/or displayed), such as content prompts, to users of system 100 on GUI 116 via display screen 122 of web client 120.

In various embodiments, prompt system 114 may comprise a server appliance running a suitable server operating system (e.g., MICROSOFT INTERNET INFORMATION SERVICES or, "IIS") and having database software (e.g., ORACLE) installed thereon. Prompt system 114 may be configured to generate, store, select, and/or display content prompts to a user on GUI 116 via display screen 122 of web client 120. In various embodiments, a content prompt may be displayed to the user to solicit or extract a desired reaction or information from the user (or person being recorded, if different) for a video clip. Therefore, prompt system 114 may generate and/or store all content prompts which may be used to create one or more video clips for a video. Each content prompt may comprise text and/or images configured to solicit the desired response from the user, and may be displayed during the recording of a video clip. Accordingly, the number of content prompts generated and/or stored by prompt system 114 may be indicative of the number of video clips to be recorded in order to produce the video. That is, for each content prompt, a video clip may be recorded and associated with the respective content prompt that was displayed for the video clip recording. In various embodiments, processor 112 may identify and/or create the association between a content prompt and a completed video clip (so processor 112 can complete the association) by detecting which content prompt(s) was displayed during the recording of a video clip. The association between the content prompt and the completed video clip may be completed, in various embodiments, by processor 112 attaching or adding a content prompt identifier associated with, or comprised in, the respective content prompt to the completed video clip, or otherwise marking the completed video clip with the appropriate content prompt identifier. In various embodiments, multiple content prompts may be displayed for the recording of a video clip and/or associated with the resulting video clip.

In various embodiments, the content prompts from prompt system 114 for creating a video may be (e.g., displayed) in a specific order (e.g., an order in which the resulting video clips will be concatenated into the video). Accordingly, each content prompt may comprise an order marker indicating the place in the order (e.g., a concatenating order that video clips associated with a respective content prompt(s) will be arranged and concatenated into the video) of multiple content prompts. The order marker may be comprised in the content prompt identifier, or the order marker may be a discrete marker. In various embodiments, in response to a video clip being created, processor 112 may associate the video clip with the respective content prompt, which may comprise marking the video clip with the order marker of the respective content prompt. Therefore, if the video clips are created in an order other than the order reflected by the order markers of the content prompts, the video clips may be concatenated in the correct order based on the order markers of the video clips and/or associated content prompts.

In various embodiments, merchant server 110 may comprise a GUI 116. GUI 116 may take different forms and/or comprise various features, and may be presented on display screen 122 of web client 120. In various embodiments, a GUI (e.g., GUI 116) may be any portion displayed on a display screen (e.g., of a webpage, program interface, or the like) having at least one device (e.g., an input device 145) or screen (e.g., windows, objects, (text) boxes, etc.) configured to facilitate recording a video clip and/or providing content suggestions or prompts for a video clip. Input device(s) 145 may be an aspect of GUI 116 displayed on display screen 122 which, in response to being selected, allows a user of system 100 to produce an input signal received by processor 112, which may command processor 112 to perform or facilitate performance of an operation. For example, input device 145 may be a digital button displayed on display screen 122 (e.g., a touch screen) which may be selected by tapping the screen on a touch screen or selecting input device 145 with a computer mouse, and/or input device 145 may be a physical button to input information. GUI 116 may also be configured to present to the consumer content prompts and a playback video such that the user may review the content prompts and see the quality and characteristics of the video to be (or being) recorded. Examples of GUI 116 are discussed in greater detail herein in relation to FIGS. 2, 5A, 5B, 6, and 7.

In various embodiments, web client 120 may incorporate hardware and/or software components. For example, web client 120 may comprise a server appliance running a suitable server operating system (e.g., MICROSOFT INTERNET INFORMATION SERVICES or, "IIS"). Web client 120 may be any device that allows a user to communicate with a network (e.g., a personal computer, personal digital assistant (e.g., IPHONE®, BLACKBERRY®), tablet, cellular phone, kiosk, and/or the like). Web client 120 may be in electronic communication with merchant server 110, video server 130, video recording system 140, and/or input device 145. In various embodiments, web client 120 may comprise an input device 145 (i.e., a physical or digital button). Web client 120 may allow the user of system 100 to interact with the other components of system 100. For example, web client 120 may comprise display screen 122, which may display GUI 116 provided by merchant server 110. A GUI for recording video clips (e.g., GUI 116) may be disposed in or take-up the entire display screen 122, or the GUI may be disposed in or take-up a portion of display screen 122. For example, GUI may be movable within the display screen (e.g., by click-and-drag, by scrolling, or the like). Display screen 122 displaying GUI 116 may allow the user to select input device(s) 145 to communicate to system 100 a desired action by system 100. Web client 120 may further comprise camera 124, which may be configured to digitally capture an image from outside web client 120. As used herein, "image" may include static images as well as video. Web client 120 may also comprise a microphone to capture audio data (e.g., during the recording of video clips).

Web client 120 includes any device (e.g., personal computer, mobile device, etc.) which communicates via any network, for example such as those discussed herein. In various embodiments, web client 120 may comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser may communicate with a server via network by using Internet browsing software installed in the browser. The browser may comprise Internet browsing software installed within a computing unit or a system to conduct online transactions and/or communications. These computing units or systems may take the form of a computer or set of computers, although other types of computing units or systems may be used, including laptops, notebooks, tablets, handheld computers, personal digital assistants, set-top boxes, workstations, computer-servers, mainframe computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, browser may be configured to display an electronic channel. Multiple users may access system 100, and therefore, in various embodiments, system 100 may comprise a web client 120 for each user (i.e., each user may have their own personal device).

In various embodiments, video recording system 140 may incorporate hardware and/or software components. For example, video recording system 140 may comprise a server appliance running a suitable server operating system (e.g., MICROSOFT INTERNET INFORMATION SERVICES or, "IIS") and having database software (e.g., ORACLE) installed thereon. Video recording system 140 may comprise video API 142, through which video recording system 140 may integrate and electronically communicate with merchant server 110, web client 120, and/or video server 130. In various embodiments, video recording system 140 may be configured to respond to commands from processor 112 (which may be in response to inputs received through GUI 116 from a user), and record video clips using camera 124 of web client 120. In response to a video clip being recorded, video recording system 140 may transmit the video clip to video server 130 to be stored in video database 132. In various embodiments, merchant server 110 may comprise a video database 132, and/or video server 130 (and/or the components comprised therein) may be comprised in merchant server 110. Processor 112 may instruct that the recorded video clip be marked with an order marker (to indicate the order of video clips which will be made into the video), and/or a content prompt identifier, associated with the respective content prompt to associate the video clip with the respective content prompt. Video server 130 and/or video recording system 140 may mark the recorded video clips accordingly.

In various embodiments, video server 130 may incorporate hardware and/or software components. For example, video server 130 may comprise a server appliance running a suitable server operating system (e.g., MICROSOFT INTERNET INFORMATION SERVICES or, "IIS") and having database software (e.g., ORACLE) installed thereon. Video server 130 may be in electronic communication with merchant server 110 and/or video recording system 140. In various embodiments, video server 130 may comprise video database 132 and/or video stitching system 134. Video database 132 may be configured to store video clips that are recorded by video recording system 140, and/or videos created from the recorded video clips. In response to a video clip being transmitted to video server 130, video server 130 may store the video clip, as discussed, and/or may transmit an access link to GUI 116 that is configured to allow the user to access the stored video clip. In response to the user selecting the access link and processor 112 receiving the selection, video server 130 may retrieve the stored video clip and present it (or transmit it to merchant server 110 to be presented) to the user on GUI 116.

In various embodiments, video stitching system 134 may be configured to stitch together (i.e., concatenate) the video clips recorded by video recording system 140 into a video. Processor 112 may instruct the concatenation of the video clips into a video in response to the processor 112 detecting that all of the video clips for a video project are completed to create the video for the video project, and/or in response to receiving an input from the user instructing concatenation. Processor 112 may command video stitching system 134 to process the video clips to prepare for stitching, which may include confirming there is audio and visual information for each video clip, resizing the video clips to achieve a uniform file size, reformatting the video clips to achieve a desired format, and/or the like. Such processing may occur at any suitable time, such as in response to the video clips being received from video recording system 140, being stored (and/or during storage) in video database 132, in response to processor 112 instructing video stitching system 134 to concatenate the video clips, or the like. Upon command from processor 112, video stitching system 134 may detect the order marker of each video clip, dispose the video clips in the appropriate order according to the order markers, and stitch (i.e., concatenate) the video clips together into a video. As discussed, the components of video server 130 may be comprised in merchant server 110, and/or any or all the functions provided by video server 130 may be completed by merchant server 110.

In various embodiments, system 100 may allow the sharing on social media of a video, once completed, by stitching together of the respective video clips (e.g., Facebook®, Twitter®, or the like). An input device 145 may be presented on GUI 116, and in response to a user selecting this input device 145, processor 112 may transmit the video from system 100, or a link to access the video, to the desired social media website for sharing. Additionally, system 100 may allow the sharing of a video with an administrator. For example, a company may instruct one of its employees to record various video clips and create a video using system 100, and the employee may do so. An input device 145 for sharing with an administrator (e.g., the employee's supervisor within the company) may be presented on GUI 116, and in response to the employee selecting this input device 145, processor 112 may transmit the video from system 100, or a link to access the video, to the administrator.

Figure 2:
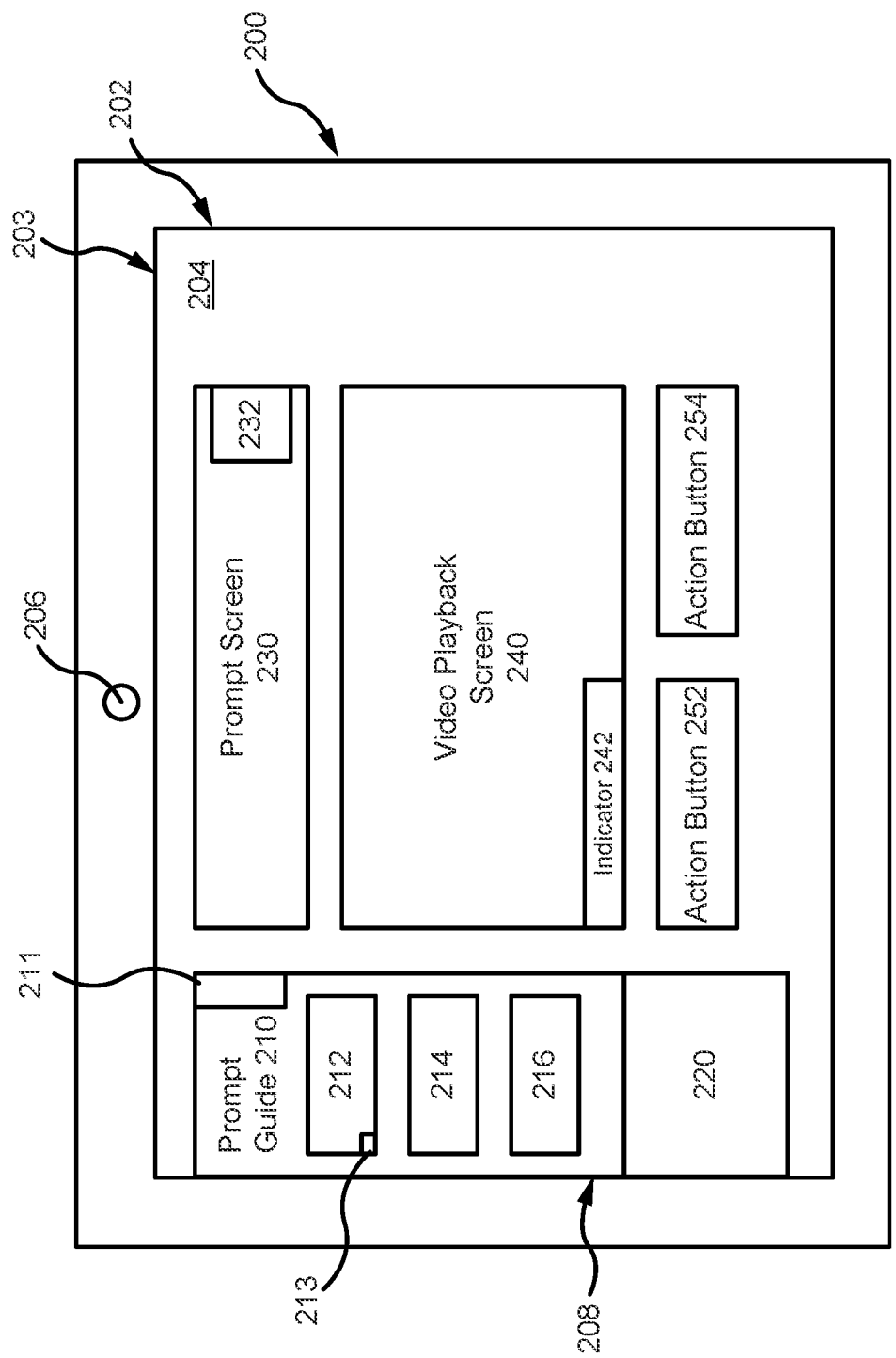
FIG. 2 illustrates an exemplary display screen on a web client depicting a GUI provided by a video production system, in accordance with various embodiments.

FIG. 2 illustrates a web client 200 (an example of web client 120 depicted in FIG. 1), with a GUI 204 (an example of GUI 116 depicted in FIG. 1) displayed on display screen 202 (an example of display screen 122 depicted in FIG. 1), in accordance with various embodiments. Web client 200 may further comprise a camera 206 (an example of camera 124 depicted in FIG. 1).

With combined reference to FIGS. 1 and 2, in various embodiments, GUI 204 may comprise a prompt screen 230, a video playback screen 240, and/or a number of other aspects or components, including one or more input devices 145. The term "screen(s)" is used herein to reference a portion or component of a GUI (e.g., a (text) box, window, object, menu, etc.) that has certain content, text, material, and/or the like, whether or not such "screen" is defined by a surrounding box or other border or boundary. Prompt screen 230 may display a content prompt configured to solicit a certain reaction and/or information from the user during recording of a video clip. A content prompt may be displayed on prompt screen 230 before, during, and/or after recording of the respective video clip. The content prompt displayed on prompt screen 230 may be one of the content prompts 212-216 displayed in a prompt guide 210. In various embodiments, prompt screen 230 may be a discrete component of GUI 204, or prompt screen 230 may simply be a portion of GUI 204 without defined boundaries.

In various embodiments, prompt guide 210 may provide a list of the content prompts to be addressed in, and utilized in the recording of, respective video clips, which upon completion, may be stitched to create the video (i.e., the concatenation of at least a portion of the video clips produced). Prompt guide 210 may be displayed prominently on GUI 204. In various embodiments, prompt guide 210 may be displayed proximate or adjacent to an outer edge 208 of GUI 204. In various embodiments, prompt guide 210 may be a discrete component of GUI 204, or prompt guide 210 may simply be a portion of GUI 204 without defined boundaries. Prompt guide 210 may be displayed simultaneously with prompt screen 230, video playback screen 240, and/or any other component of GUI 204. The content prompts (e.g., content prompts 212-216) may be displayed in a display order, which may be dictated by the order marker of each content prompt. In various embodiments, the display order may be the same as the concatenating order. That is, if first content prompt 212 is displayed above or before second content prompt 214 because of their respective order markers, a first video clip associated with first content prompt 212 will precede a second video clip associated with second content prompt 214 in the concatenating order and video resulting from the concatenation of the video clips. In various embodiments, the display order may be different than the concatenating order.

In various embodiments, a user may select the content prompt(s) (e.g., one or more of content prompts 212-216) to be displayed in prompt screen 230, therefore, allowing the user to create the video clips in any order regardless of the display order of the content prompts in prompt guide 210 and/or order markers of the content prompts. For example, if a user wanted to create a video clip addressing second content prompt 214 before a video clip addressing first content prompt 212, user may select second content prompt 214 (an example of an input device 145) in prompt guide 210. Processor 112 may receive such a selection and display content prompt 214 in prompt screen 230. In various embodiments, the user may select a skip tool 232 to advance to the next content prompt (i.e., the content prompt having the subsequent order marker, or the content prompt without an associated recorded video clip having the next sequential order marker), rather than specifically selecting a desired content prompt from prompt guide 210. In various embodiments, prompt guide 210 may be hidden by selecting a collapse/expand button 211. In response to selecting collapse/expand button 211, processor 112 may translate prompt guide 210 to a different configuration. For example, if prompt guide 210 is visible to the user (i.e. expanded), as depicted in FIG. 2, and processor 112 receives an input from collapse/expand button 211, processor 112 may collapse prompt guide 210. The opposite may occur if processor 112 receives an input from collapse/expand button 211 while prompt guide 210 is collapsed: prompt guide 210 may be expanded to be visible to the user.

In various embodiments, video playback screen 240 may provide an image or video of what information camera 206 is capturing. For example, if the user is in front of camera 206, and camera 206 is capturing data (i.e., camera 206 is on, not necessarily recording), the user's image would be displayed on video playback screen 240. Such a display may be in real time. The display provided by video playback screen 240 may be displayed whether or not anything is being recorded. During recording, the user may see what is being recorded by referencing video playback screen 240. Indicator 242 may be comprised in or adjacent to video playback screen 240, which may display characteristics and/or statuses of the data captured by camera 206 and displayed on video playback screen 240. For example, indicator 242 may indicate whether the information captured by camera 206 is being recorded (e.g., by the presence of a red dot for recording), the brightness level of the image being capture by camera 206, the volume level of the audio data being captured by a microphone comprised in web client 200, the duration of recording that has taken place or that is remaining, or the like.

In various embodiments, prompt screen 230 may be disposed on GUI 204 proximate or adjacent to camera 206. That is, prompt screen 230 may be disposed on GUI 204 such that there is no other component (e.g., input device 145, display, or the like) on GUI 204 between prompt screen 230 and camera 206 (or the edge of display screen 202 or GUI 204 proximate camera 206), and/or the space between prompt screen 230 and camera 206 is small (e.g., less than one inch (2.54 centimeters (cm)), less than one cm (0.39 inch), or less than 0.5 cm (0.20 inch). Therefore, the user's eyes, if reading the content prompt displayed in prompt screen 230 to determine what to do or say while recording a video clip, may be proximate to camera 206 and appear to be making eye-contact with camera 206. Also, video playback screen 240 may be disposed on GUI 204 proximate and/or adjacent to prompt screen 230 and/or camera 206 for similar reasons. As shown in FIG. 2, prompt screen 230 is disposed between camera 206 and video playback screen 240, which may allow a user to view prompt screen 230 and appear to be looking at camera 206, while placing video playback screen 240 in the user's peripheral vision.

In various embodiments, GUI 204 may comprise action buttons 252 and 254 (examples of input devices 145, allowing a user to provide an input and/or command to system 100), selection of which may allow a user to command processor 112 to complete an action. For example, action button 252 may be a "record" button, which when selected, causes processor 112 to command video recording system 140 to start recording the information being captured by camera 206. In various embodiments, action button 252 may become a "stop recording" while video recording system 140 is recording the information being captured by camera 206. As another example, action button 254 may be a "delete" and/or "redo" button, which, in response to being selected by the user, causes system 100 to delete anything that was recorded for the video clip associated with the content prompt displayed in prompt screen 230 in order to redo the video clip. One video clip may be re-recorded without disturbing other recorded video clips. In various embodiments, action buttons 252 and 254 may provide an input for other actions such as "share" (e.g., with social media), "continue recording," "save," "upload," "stitch" (i.e., concatenate, or create the video), or the like. Action buttons 252 and 254 may, for example, be selected on GUI 204 (i.e., by touching a touchscreen or clicking a computer mouse), or by pressing a button on a keyboard, for example, associated with action button 252 and/or 254. For example, to start and stop recording, the user may either select action button 252, or press the spacebar (or another assigned key) on a keyboard. In various embodiments, there may be any suitable number and arrangement of action buttons in GUI 204 to provide the necessary functions allowing a user to utilize system 100.

In various embodiments, GUI 204 may comprise a review screen 220. Review screen may be configured to replay a recorded video clip associated with a content prompt 212-216. For example, if content prompts 212 and 214 each had a recorded video clip associated with them and stored in video database 132, the user may select the content prompt associated with the video clip the user wishes to review and/or redo, and the associated video clip may be displayed in review screen 220. That way, the user may review a previously recorded video clip, and video playback screen 240 may still capture data from camera 206 (and a microphone for audio data) to continually show how a video clip will be recorded. In various embodiments, processor 112 may dispose a recorded marker 213 on a content prompt with a recorded video clip associated with it (e.g., content prompt 212, as depicted in FIG. 2), allowing the user to review which content prompts video clips have been recorded. Additionally, in various embodiments, review screen 220 may also comprise action buttons similar to action buttons 252 and 254, and/or an indicator similar to indicator 242, as discussed herein. In various embodiments, upon selection of a content prompt 212-216 having a previously recorded video clip, the video clip may appear in video playback screen 240 for review.

Figure 3:
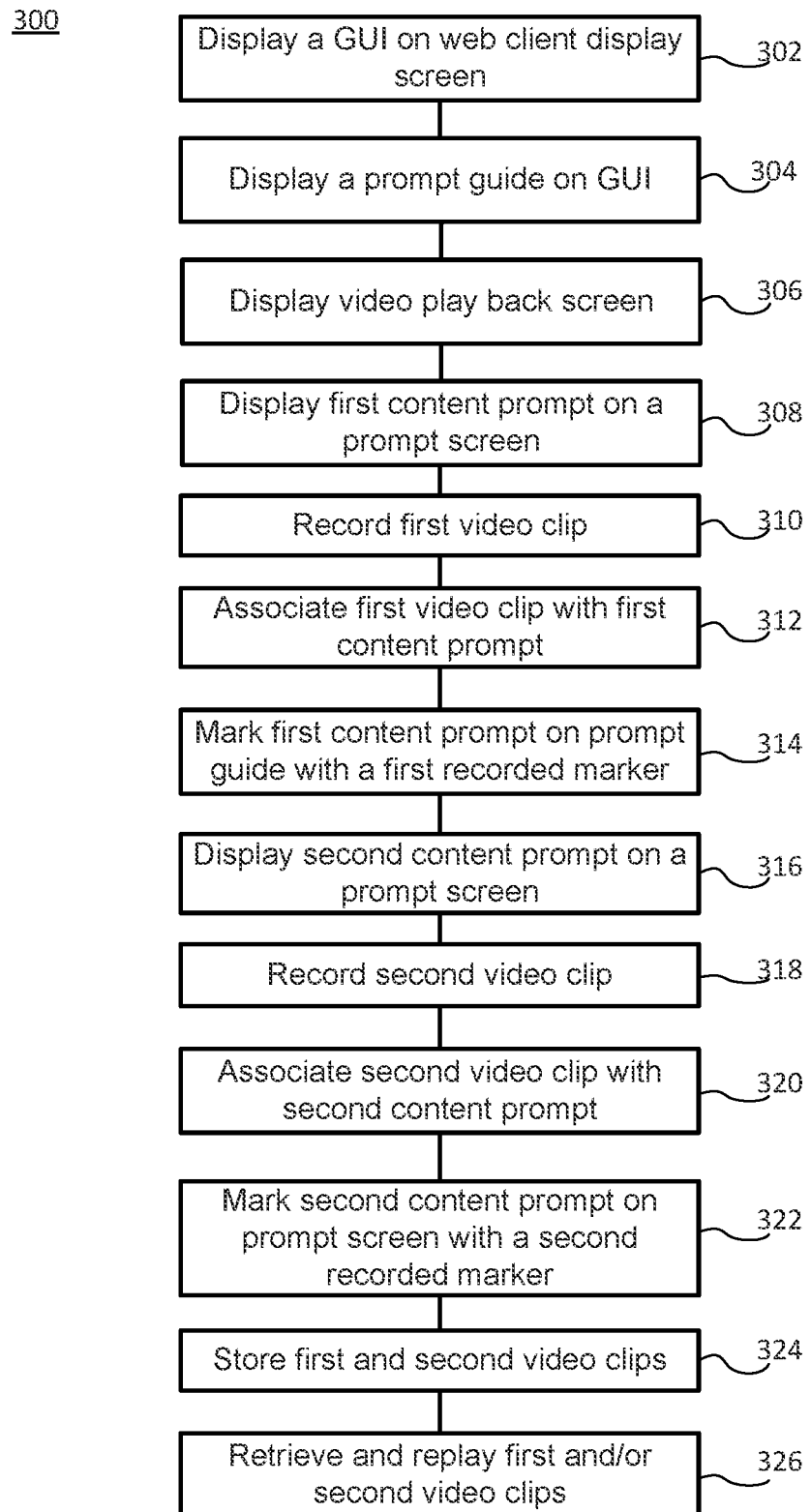
FIG. 3 illustrates a flowchart depicting an exemplary method for recording video clips by utilizing a video production system, in accordance with various embodiments.
Figure 4:
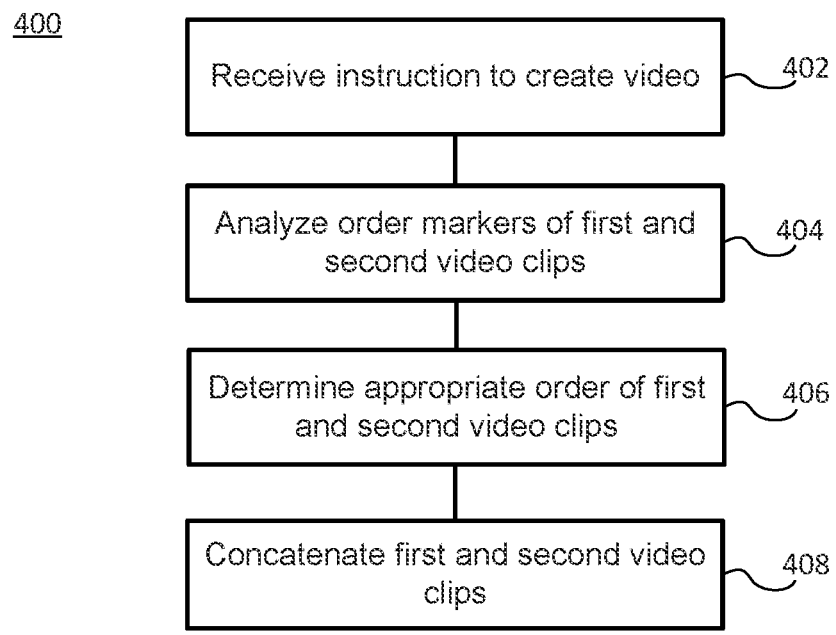
FIG. 4 illustrates a flowchart depicting an exemplary method for producing a video by utilizing a video production system, in accordance with various embodiments.

Referring now to FIGS. 3-4 the process flows and screenshots depicted are merely embodiments and are not intended to limit the scope of the disclosure. For example, the steps recited in any of the method or process descriptions may be executed in any combination and/or order and are not limited to the order presented. It will be appreciated that the following description makes appropriate references not only to the steps and user interface elements depicted in FIGS. 3-4, but also to the various system components as described above with reference to FIGS. 1 and 2.

FIG. 3 depicts a method 300 for recording video clips using system 100, in accordance with various embodiments. With combined reference to FIGS. 1-3, a user may desire to create a video comprising video clips having a different person and/or content featured in each video clip. Therefore, the user may utilize system 100, and system 100 and/or processor 112 may display a GUI 116 (e.g., GUI 204) on display screen 122 of web client 120 (step 302). GUI 116 may allow the user to interact with system 100. It should be understood processor 112 may perform the functions of system 100 and/or the steps of methods 300 and/or 400 (of FIG. 4). However, as discussed herein, it is also within the scope of this disclosure that each component of system 100 may have a separate processor performing functions, or processor 112 may be located in another component of system 100, or processor 112 may be a separate component of system 100.

In various embodiments, prompt system 114 may generate one or more content prompts, which will be used to solicit a desired response, content, story, and/or information from the user (i.e., the person being recorded) for respective video clips. Prompt system 114 may generate content prompts based on a topic received and/or inputted from the user. For example, the topic may be food, so prompt system 114 may generate content prompts to get the user to talk about different aspects of food in each video clip to be created. As another example, the video clips to be prepared may be introduction video clips. Accordingly, prompt system 114 may prepare content prompts instructing the users to provide information about themselves. In various embodiments, a user (e.g., a customer paying to utilize system 100) may prepare the content prompts based on the desired number and content of video clips and provide the content prompts to merchant server 110 and prompt system 114.

In various embodiments, the content prompts (e.g., content prompts 212-216) each may comprise and/or be marked with a content prompt identifier by prompt system 114 and/or processor 112, which may be a digital piece of information (e.g., comprised in the respective content prompt) unique to the respective content prompt to identify the content prompt. In various embodiments, the content prompts (e.g., content prompts 212-216) each may comprise and/or be marked with an order marker by prompt system 114 and/or processor 112, which may be a digital piece of information (e.g., comprised in the respective content prompt) indicating which place in an order the associated content prompt belongs. In various embodiments, the order marker may be comprised in the content prompt identifier associated with the content prompt. The order may reflect the desired order in which the video clips associated with the content prompts may be displayed to the user in prompt guide 210 and/or the order in which the video clips will be concatenated together to form a video. Therefore, as an example, first content prompt 212 may receive a first order marker, indicating that an associated video clip will be the first in the video clip order during concatenation, second content prompt 214 may receive a second order marker, indicating that an associated video clip will be the second in the video clip order during concatenation, and third content prompt 216 may receive a third order marker, indicating that an associated video clip will be the third in the video clip order during concatenation.

In various embodiments, processor 112 may display a prompt guide 210 on GUI 204 (step 304), in which the content prompts 212-216 may be displayed in order according to their respective order markers (which may indicate the order in which the video clips associated with the respective content prompts 212-216 will be concatenated into a video). In various embodiments, prompt guide 210 may be displayed in any suitable location on GUI 204, such as proximate an outer edge 208 of GUI 204, and/or proximate and/or adjacent to prompt screen 230 and/or video playback screen 240. Content prompts 212-216 displayed in prompt guide 210 may comprise abbreviated, shortened, and/or smaller versions of any text or images comprised in content prompts 212-216 as displayed on prompt screen 230.

In various embodiments, during use of system 100, information may be (continually) captured by video recording system 140 through camera 206. Video recording system 140 may be integrated with web client 120 via video API 142. To show the user what (visual) information is being captured via camera 206, processor 112 may display video playback screen 240 (step 306) on GUI 204. Video playback screen 240 may be prominent in GUI 204 for easy viewing by the user. Video playback screen 240 may display the visual information being captured through camera 206 whether or not system 100 is recording. Additionally, video playback screen 240 may comprise indicator 242, which may display one or more aspects or characteristics of the information being captured through camera 206 (e.g., whether the information is being recorded or not, brightness level or other visual elements, the sound or volume level of audio information being captured by a microphone, the duration of the recording, or the like).

In various embodiments, prompt screen 230 may be displayed in GUI 204. Prompt screen 230 may be disposed on GUI 204 proximate and/or adjacent to the location of camera 206 on web client 200. Accordingly, in various embodiments, prompt screen 230 may be disposed on GUI 204 on the top of GUI 204 (i.e., adjacent and/or proximate to a top edge 203 of display screen 202). Processor 112 may display first content prompt 212 on prompt screen 230 (step 308). The display of first content prompt 212 on prompt screen 230 may be automatically facilitated and/or completed by processor 112 in response to system 100 receiving the content prompts and/or the display of prompt guide 210 including content prompts 212-216. That is, in various embodiments, processor 112 may automatically display the content prompt with the first order marker (i.e., the order marker indicating that the associated video clip will be the first in the resulting video) in prompt screen 230 in response to a user beginning use of system 100. In various embodiments, first content prompt 212 may be displayed in prompt screen 230 in response to a user selecting content prompt 212 in prompt guide 210 (content prompts 212-216 in prompt guide 210 may be input devices 145 which a user may select). In various embodiments, a content prompt (e.g., content prompt 212) will be displayed in prompt screen 230 in response to selection of the content prompt in prompt guide 210 if the content prompt does not comprise a recorded mark (e.g., recorded marker 213). Prompt screen 230 may be disposed proximate and/or adjacent to camera 206 so that the user (or person being recorded) may review the displayed content prompt during video clip recording while appearing to look into camera 206.

Video playback screen 240 may be disposed in GUI 204 proximate and/or adjacent to prompt screen 230 and/or camera 206 for similar reasons as the disposition of prompt screen 230 described herein. With such a location of video playback screen 240 in GUI 204, during recording, a user may monitor the visual information being captured through camera 206 displayed on video playback screen 240 while appearing to look at camera 206, and easily review prompt screen 230. Additionally, because of the prominent display of video playback screen 240 in GUI 204, the user may review prompt screen 230 and/or look into camera 206 while still having video playback screen 240 in the user's peripheral vision to continually monitor the video being captured.

In various embodiments, a user may record a first video clip (step 310), which may occur while first content prompt 212 is displayed on prompt screen 230. The user may select a "record" button, such as one of action buttons 252, 254 on GUI 204, and/or press a physical button (e.g., the spacebar on a keyboard) to begin recording. In response, processor 112 may receive the input from the user to record and command video recording system 140 to do so. Video recording system 140 will begin recording the visual data captured through camera 206 (and/or audio data captured through a microphone). In various embodiments, the user may select a "pause" or "stop" recording button (e.g., action buttons 252, 254). An action button may also comprise, for example, a "redo" button to delete the current recorded video clip and start again, or a "finish" button to indicate to processor 112 that the recording of the first video clip is complete (i.e., the user is satisfied with the first video clip). The user may record the first video clip while providing content solicited from first content prompt 212 displayed in prompt screen 230.

In various embodiments, in response to the recording of the first video clip being complete, which may include the user being satisfied with the first video clip and/or requesting to save or upload the first video clip (as indicated to processor 112, for example, by the selection of a "finish" or "save" button or the like), processor 112 may associate the first video clip with first content prompt 212 (step 312). That is, whichever content prompt(s) was displayed in prompt screen 230 during the recording of a video clip will be associated with the completed video clip. Associating the first video clip with first content prompt 212 may comprise processor 112 adding the first order marker to the first video clip, the same first order marker associated with and/or comprised in first content prompt 212. In various embodiments, associating the first video clip with the first content prompt 212 may comprise processor 112 attaching or adding a first content prompt identifier associated with first content prompt 212 to the first video clip, or otherwise marking the first video clip with the first content prompt identifier. Additionally, first content prompt 212 may receive a first recorded marker 213 in prompt guide 210 (step 314) to indicate that there is a recorded video clip associated with first content prompt 212.

In various embodiments, in response to the completion of recording a video clip (e.g., the first video clip), and/or associating the video clip with the respective content prompt, video recording system 140 may transmit the video clip to video server 130 to be stored in video database 132 (step 324). The transmission to and storage by video server 130 of the first video clip may be in response to the user selecting a "complete," "save," "upload," or the like action button, indicating that the user is satisfied with the second video clip, and wishes to save it.

In various embodiments, the user may review previously recorded video clips (i.e., video clips associated with content prompts having recorded markers displayed in prompt guide 210). For example, if the user wants to review the first video clip, the user may select first content prompt 212 having first recorded marker 213. In response, processor 112 may retrieve the first video clip from video database 132. A review screen 220 may appear on GUI 204 (which may only be present while reviewing a previously recorded video clip) and display the first video clip for review. Action buttons similar to action buttons 252, 254 may be displayed with and/or in review screen 220 such that the user may select an action button in order to delete, redo, edit, or conduct other like actions to the first video clip. Review screen 220 may allow the user to review the desired video clip, while still able to see monitor the visual information captured through camera 206 on video playback screen 240. In various embodiments, in response to selection of a content prompt that has a recorded video clip associated with it, the associated video clip may be reviewed on video playback screen 240 rather than a review screen 220.

In various embodiments, in response to the first video clip being recorded and/or stored in video database 132 (i.e., recording of the first video clip is complete), processor 112 may display second content prompt 214 on prompt screen 230 (step 316). During display of second content prompt 214 on prompt screen 230, first content prompt 212 may not be displayed on prompt screen 230 (i.e., first content prompt 212 may be removed from prompt screen 230 in response to the recording of the first video clip being complete). The display of second content prompt 214 on prompt screen 230 may take place automatically in response to completion of the first video clip. That is, in various embodiments, the content prompt with the next sequential order marker (i.e., in this example, content prompt 214 having the second order marker) may automatically be displayed in prompt screen 230. In various embodiments, the content prompt without an associated recorded video clip having the next sequential order marker may automatically be displayed in prompt screen 230. If all content prompts have completed video clips associated with them, processor 112 may display an alert in prompt screen 230 to the user indicating that there are no more video clips to be recorded. In various embodiments, the user may select the next content prompt to be displayed in prompt screen 230 by selecting the desired content problem displayed in prompt guide 210. Therefore, to display second content prompt 214 in prompt screen 230, the user may select content prompt 214 in prompt guide 210. In response, processor 112 may cause the display of second content prompt 214 in prompt screen 230. If the user wants to skip a content prompt displayed in prompt screen 230 (i.e., record a video clip in association with a different content prompt), the user may select skip tool 232. In response, processor 112 may cause the content prompt with the next sequential order marker to be displayed in prompt screen 230 (in this example, the user may skip second content prompt 214, and in response, processor 112 would display third content prompt 216 in prompt screen 230), or the content prompt without an associated recorded video clip having the next sequential order marker may be displayed in prompt screen 230. In various embodiments, a display marker may be disposed on the content prompt in prompt guide 210 which is displayed in prompt screen 230. A display marker may be similar to recorded marker 213.

Returning to the display of second content prompt 214 on prompt screen 230 (step 316), the user may review second content prompt 214. Similar to step 310, a user may record a second video clip (step 318), which may occur while second content prompt 214 is displayed on prompt screen 230. The user may select a "record" button, such as one of action buttons 252, 254 on GUI 204, and/or press a physical button (e.g., the spacebar on a keyboard) to begin recording. In response, processor 112 may receive the input from the user to record and command video recording system 140 to do so. Video recording system 140 will begin recording the visual data captured through camera 206 (and/or audio data captured through a microphone). In various embodiments, the user may select a "pause" or "stop" recording button (e.g., action buttons 252, 254, or a physical button). An action button may also comprise, for example, a "redo" or "delete" button to delete the current recorded video clip and start again, or a "finish" button to indicate to processor 112 that the recording of the second video clip is complete (i.e., the user is satisfied with the second video clip). The user may record the second video clip while providing content solicited from second content prompt 214 displayed in prompt screen 230.

In various embodiments, in response to the recording of the second video clip being complete, which may include the user being satisfied with the second video clip and/or requesting to save or upload the second video clip (as indicated to processor 112, for example, by the selection of a "finish" or "save" button or the like), processor 112 may associate the second video clip with second content prompt 214 (step 320). Associating the second video clip with second content prompt 214 may comprise processor 112 adding the second order marker to the second video clip, the same second order marker associated with and/or comprised in second content prompt 214. In various embodiments, associating the second video clip with the second content prompt 214 may comprise processor 112 attaching or adding a second content prompt identifier associated with second content prompt 214 to the second video clip, or otherwise marking the second video clip with the second content prompt identifier. Additionally, second content prompt 214 may receive a second recorded marker (similar to first recorded marker 213) in prompt guide 210 (step 322) to indicate that there is a recorded video clip associated with second content prompt 214.

In various embodiments, in response to the completion of the second video clip, and/or associating the second video clip with second content prompt 214, video recording system 140 may transmit the second video clip to video server 130 to be stored in video database 132 (step 324), similar to the storage of the first video clip. The transmission to and storage by video server 130 of the second video clip may be in response to the user selecting a "complete," "save,"

"upload," or the like action button, indicating that the user is satisfied with the second video clip, and wishes to save it. In various embodiments, each video clip may be transmitted to video server 130 for storage in video database 132 after completion. In various embodiments, all video clips produced for a video will be sent to video database 132 for storage in response to all desired video clips being complete.

As described herein, the user may retrieve and replay the first and/or second video clips (step 326) to review, edit, or otherwise act on the first and/or second video clip once it has been saved in video database 132. For example, if the user wants to review the second video clip, the user may select second content prompt 214 (having a second recorded marker similar to first recorded marker 213). In response, processor 112 may retrieve the second video clip from video database 132. A review screen 220 may appear on GUI 204 (which may only be present while reviewing a previously recorded video clip) and display the second video clip for review. Action buttons similar to action buttons 252, 254 may be displayed with and/or in review screen 220 such that the user may select an action button in order to delete, redo, edit, or conduct other like actions to the second video clip. Review screen 220 may allow the user to review the desired video clip, while still able to see monitor the visual information captured through camera 206 on video display screen 240. The user may exit out of review screen 220 in response to finishing review of the recorded video clip. In response to a recorded video clip being deleted or selection of a "redo" action button, the recorded marker displayed with the respective content prompt in prompt guide 210 may be removed until there is another recorded video clip associated with the content prompt. In response to a recorded video clip being deleted or selection of a "redo" action button, the content prompt associated with the deleted video clip may automatically be displayed in prompt screen 230 to facilitate re-recording the video clip. In various embodiments, in response to selection of a content prompt on prompt guide 210 that has a recorded video clip associated with it, the video clip may be reviewed on video playback screen 240 rather than a review screen 220.

Various steps of method 300 may be repeated to create a video clip associated with every desired content prompt, for any number of desired video clips and/or content prompts. For example, third content prompt 216 may be displayed in prompt screen 230, and a third video clip may be recorded and associated with third content prompt 216. Third content prompt may be marked with a third recorded marker (similar to first recorded marker 213) in prompt guide 210. The third video clip may be transmitted to and stored in video server 130. In various embodiments, a user may only make video clips for a portion of the content prompts. For example, the user may decide that one or more content prompts in prompt guide 210 are irrelevant or undesirable, and therefore, may skip those content prompts, creating video clips associated only with relevant and/or desired content prompts. In various embodiments, each video clip may be created at any time (i.e., there may be lapses between creating video clips without disturbing method 300). Furthermore, in various embodiments, different video clips may be created from different web clients 120. That is, system 100 may comprise more than one web client 120, such that multiple users may create video clips to be incorporated into a video.

FIG. 4 depicts a method 400 for creating a video by concatenating video clips using system 100, in accordance with various embodiments. In various embodiments, method 400 may be an extension of method 300 in FIG. 3. In other words, the steps of method 400 may continue or supplement, and/or take place after, the steps of method 300 in FIG. 3. With combined reference to FIGS. 1-4, a user may desire to create a video using the video clips created by performing method 300. Therefore, the user instructs system 100 to concatenate the video clips produced (e.g., by method 300) to create a video comprising the video clips. The user may instruct system 100 to create the video by selecting an action button (e.g., one of action buttons 252, 254) which may be a "create video" or "stitch" action button. In various embodiments, processor 112 may detect that each content prompt has an associated video clip, and in response, present the user with a "create video" or "stitch" action button. In response of the user's selection of same, processor 112 may receive the instruction to create the video (step 402). In various embodiments, processor 112 may detect that each content prompt has an associated video clip, and in response, processor 112 may automatically start the video creation process (i.e., there may be no need to receive an instruction to create the video).

In various embodiments, video server 130 and/or video stitching system 134 may process the video clips received from video recording system 140. For example, video server 130 and/or video stitching system 134 may resize all video clips received to achieve a uniform size, reformat the video clips to achieve a uniform or desired format, or the like. Additionally, video server 130 and/or video stitching system 134 may analyze the video clips to make sure they all have the same components. For example, if one video clip does not have audio data, video server 130 and/or video stitching system 134 may detect the same and add blank audio data, to cause that video clip's contents to be uniform with the other video clips comprising audio data. Such processing may take place because video clips may be recorded by different users using different web clients 120, different software, or the like. Processing the video clips may take place in response to their receipt by video server 130 and before storage within video database 132, after or during storage in video database 132, and/or in response to receipt of an instruction by processor 112 that the video clips will be concatenated (i.e., stitched) into a video.

In various embodiments, the user may review the video clips stored in video database 132, and select which video clips to include in the concatenation to produce the video. In various embodiments, in response to receiving the user's instruction to create the video, processor 112 may analyze the video clips to be combined into the video (e.g., the video clips created in association with the content prompts, or video clips selected by the user). Processor 112 may detect and analyze the order markers comprised in and/or associated with each video clip (e.g., the first and second video clips from method 300 in FIG. 3) (step 404) to be concatenated into the video. By analyzing the order markers of each video clip, processor 112 may determine the appropriate order of the video clips (e.g., the first and second video clips) (step 406) for production of the video. For example, processor 112 may detect and analyze the first order marker of the first video clip and the second order marker of the second video clip, and determine that between the two video clips, the first order marker of the first video clip indicates that the first video clip should be first in a video clip order for concatenation into the video. As such, the user may record and/or store video clips associated with content prompts in any desired order, regardless of the order markers of the content prompts, and processor 112 will be able to find the correct order of the video clips for the video by analyzing the respective order markers. In various embodiments, processor 112 may determine that the appropriate order of video clips may be the same order in which the video clips were recorded and/or stored in video database 132. In various embodiments, processor 112 and/or video stitching system 134 may order the video clips in the determined order. In various embodiments, content prompts may not comprise order markers, and therefore, video clips may receive order markers by processor 112 based on the order in which the video clips are recorded and/or stored.

In various embodiments, in response to determining the appropriate video clip order, processor 112 may command video stitching system 134 to concatenate (i.e., stitch together) the video clips (e.g., the first and second video clips) (step 408) to create the video. To concatenate the video clips, video stitching system 134 may take the file(s) for each video clip, and join them together to create one continuous file (which may comprise audio/visual data), i.e., the video. In various embodiments, processing the video clips as described herein (e.g., resizing, reformatting, or the like) may be part of concatenating the video clips.

In response to video stitching system 134 creating the video, the video may be stored in video database 132. Processor 112 may present an access link (e.g., an action button) to the video on GUI 116 so the user may view the video. There also may be action buttons to delete, edit, redo, upload, share (e.g., on social media), or the like. The user may select the desired action button to take the desired action.

In various embodiments, returning to FIG. 1, system 100 may be configured to allow a business (e.g., the entity associated with merchant server 110) to interact with its customers. Such customers may interact with system 100 through the customer's own web client (e.g., a personal computer, smart phone, or the like) by selecting input device(s) 145 to command an action(s) by the system, which are received by processor 112.

Figure 5A:
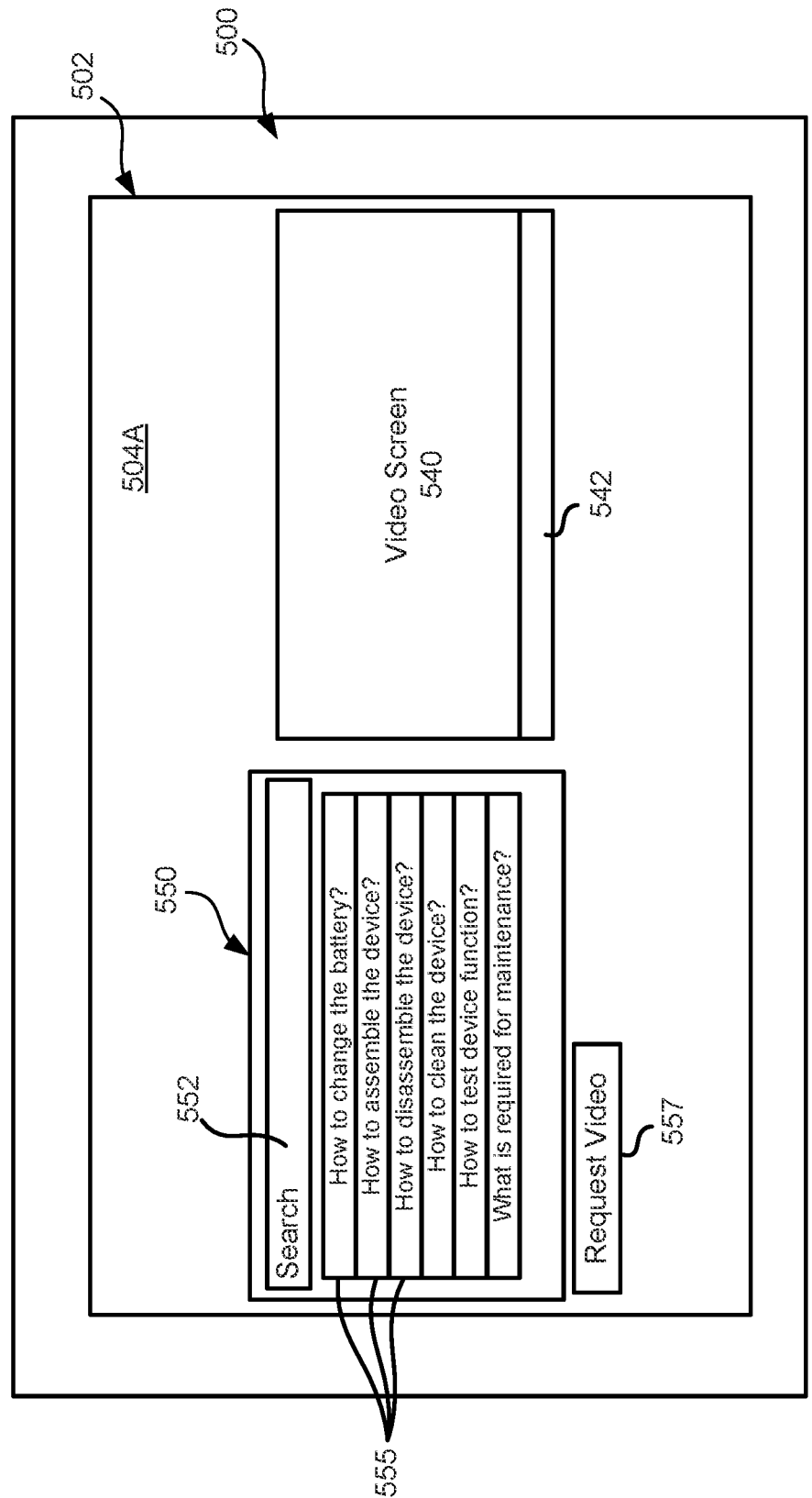
FIG. 5A illustrates an exemplary display screen on a web client depicting a GUI provided by a video production system, in accordance with various embodiments.

With additional reference to FIG. 5A, the GUI 116 presented to the user (e.g., a customer of a merchant or business) on display screen 122 of web client 120 may be a webpage on the business or merchant's website. For example, GUI 504A maybe be a GUI (presented on display screen 502 of web client 500) on the merchant's website associated with a certain brand or product. GUI 504A may comprise information for the customer to view, for example, regarding a product and information about such product. There may be inquiries 555 listed in inquiry box 550 on GUI 504A (e.g., frequently-asked questions), which the customer (user) may select to receive related information. The customer may search the inquiries using search box 552 to see if their specific inquiry has already been asked and/or answered. In response to an inquiry 555 being selected by the user (each inquiry may be an input device 145), information regarding the selected inquiry may appear on GUI 504A. For example, textual or pictorial information may display below the selected inquiry 555 (moving the other inquiries out of the way or covering them). As another example, a video answering or discussing the selected inquiry 555 may be populated in video screen 540. The video associated with the selected inquiry may automatically begin to play in video screen 540 in response to such selection, or the customer (user) may select a "play" button to start the video. Video indicator 542 may display the title, inquiry, or other information associated with the video being played. If the customer's question or inquiry is not found in question box 555 or otherwise does not have any information to address such inquiry, the customer may select the request video button 557 (another input device 145).

Figure 5B:
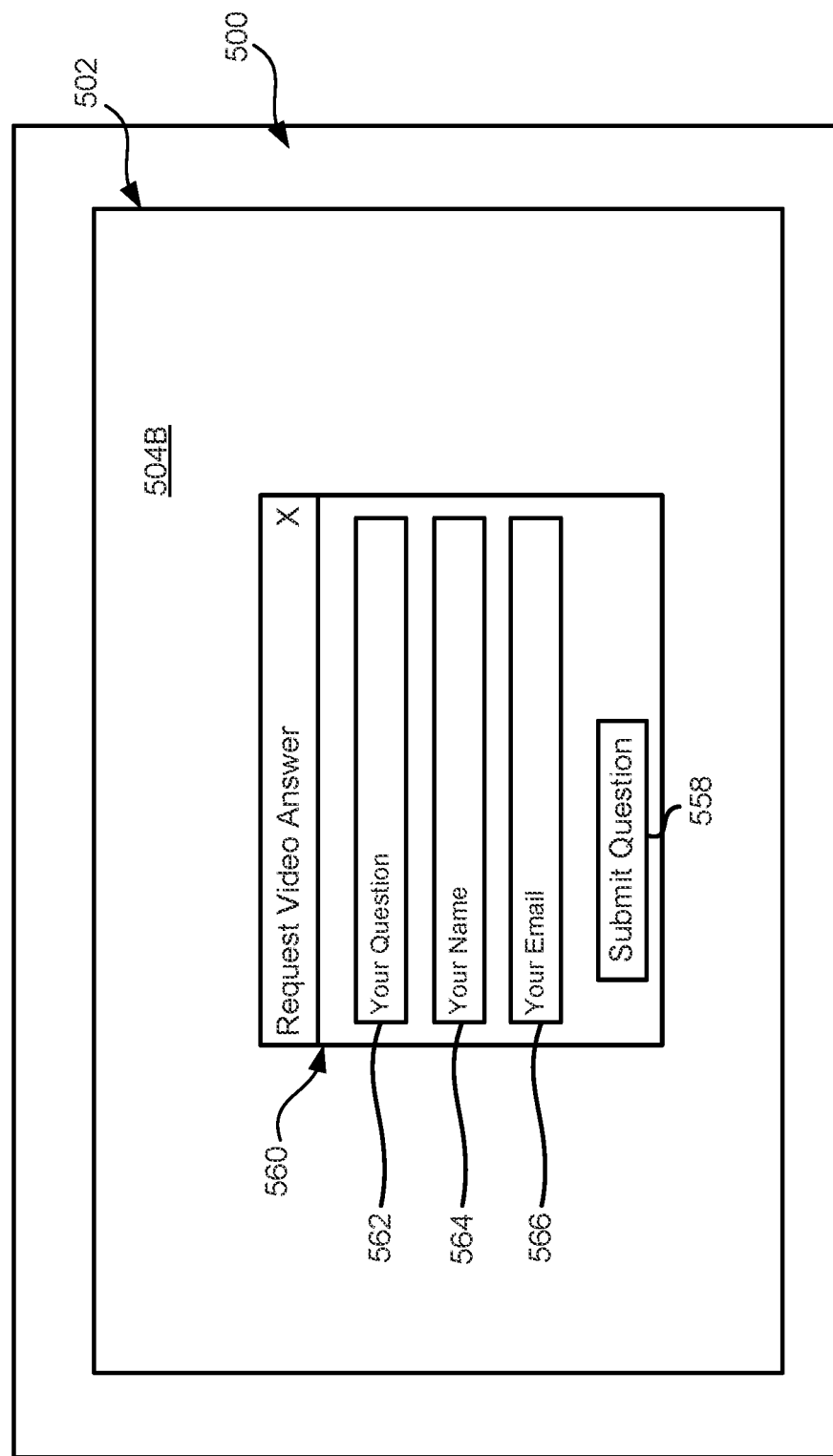
FIG. 5B illustrates an exemplary display screen on a web client depicting a GUI provided by a video production system, in accordance with various embodiments.
Figure 6:
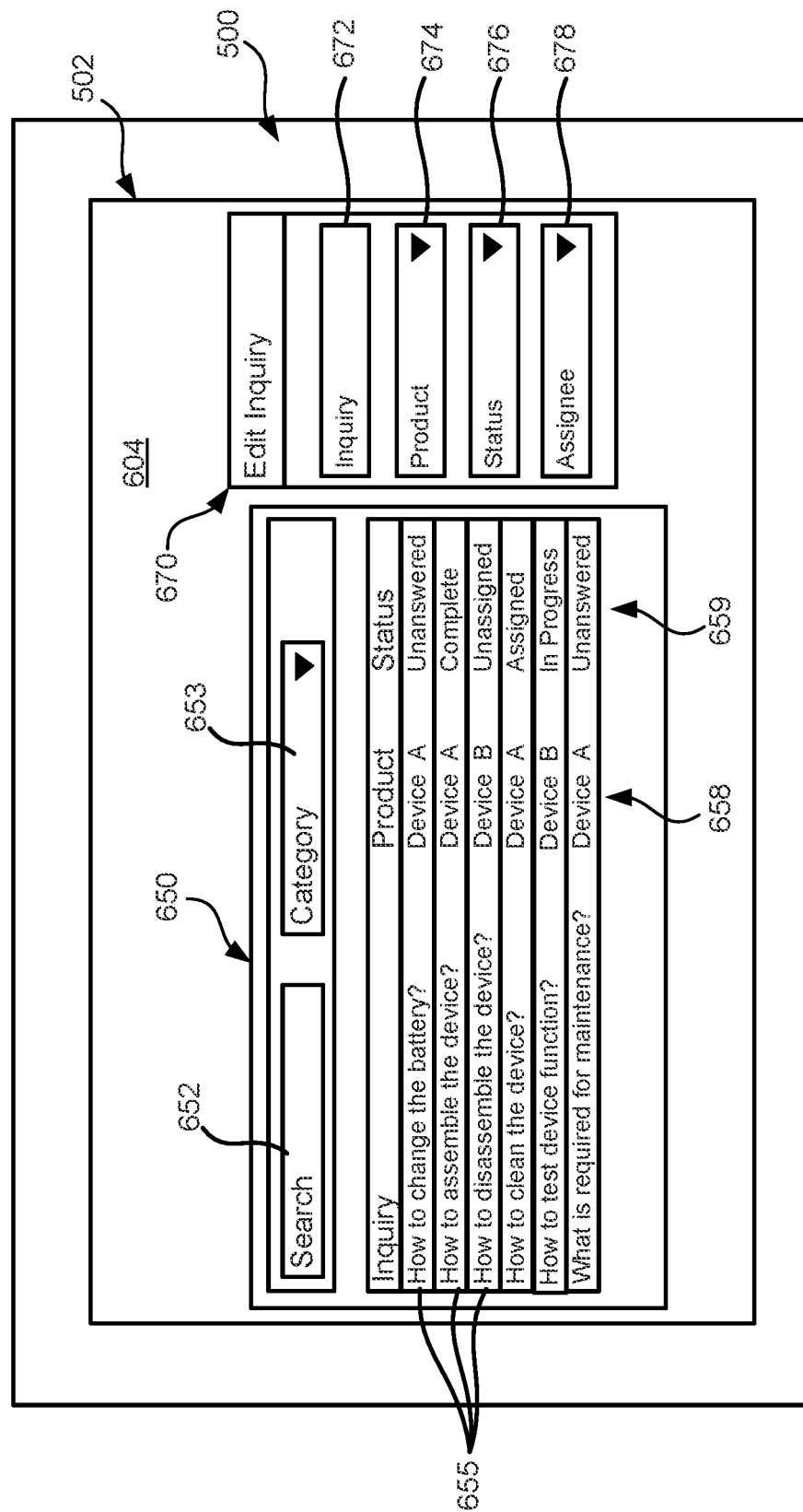
FIG. 6 illustrates an exemplary display screen on a web client depicting a GUI provided by a video production system, in accordance with various embodiments.

With additional reference to FIG. 5B, in response to selecting request video button 557, and the system receiving such selection, GUI 504B comprising a request video screen 560 may be presented to the customer. In request video screen 560, the customer may enter an inquiry into box 562, and provide requested identifying and/or contact information in boxes 564 and/or 566. In response to the inquiry and information being entered by the customer, the customer may select the submit button 558 to submit the inquiry to the merchant. In response to the inquiry submission, the customer may be re-presented with GUI 504A. The system may receive the submitted inquiry, which may be presented and listed in inquiry box 550. Because such inquiry was recently submitted, there may be a marker (e.g., a symbol, shape, and/or text) indicating that the inquiry is presently unanswered. Such a marker may also be associated with any other inquiry that does not have a response associated therewith. Similarly, in various embodiments, answered inquiries may comprise a marker indicating that such inquiries have associated answers or responses.

Figure 8:
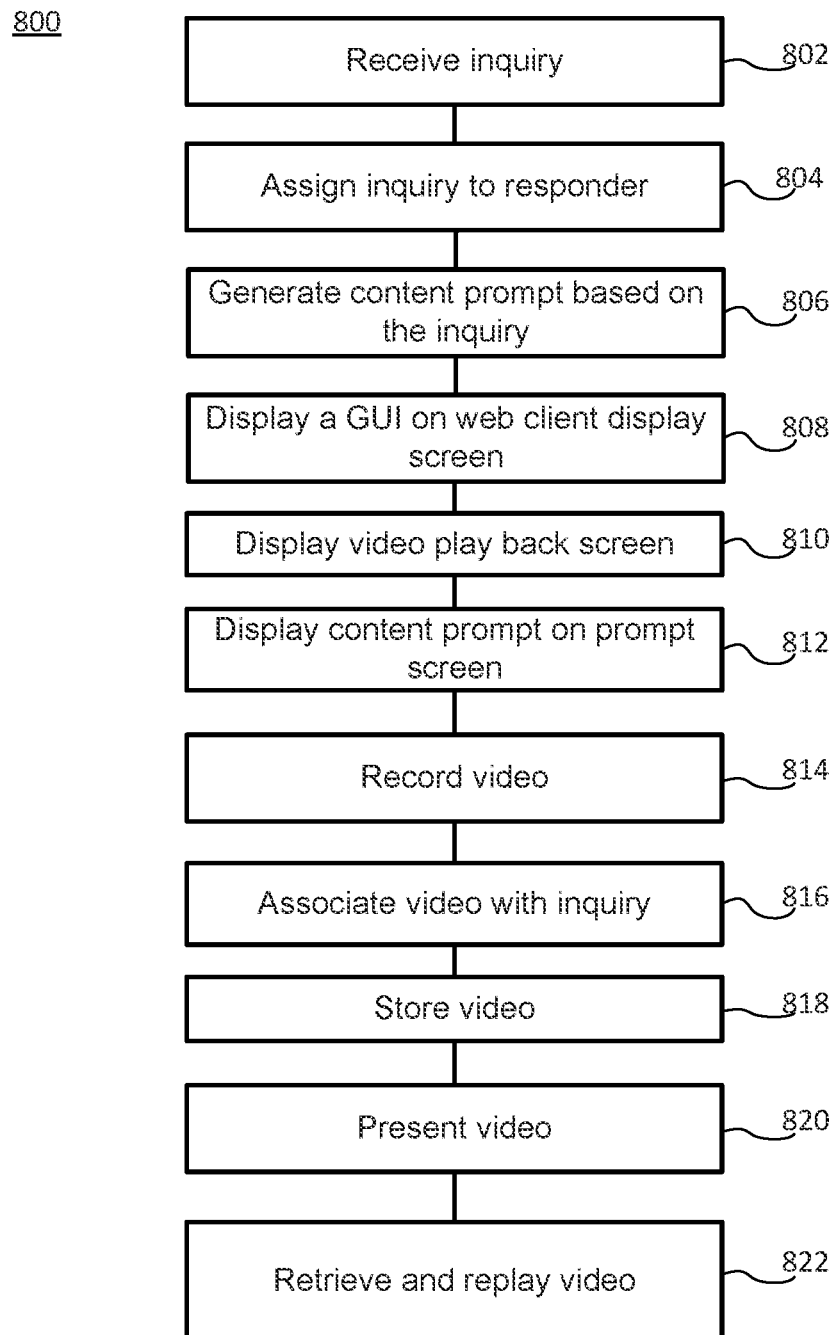
FIG. 8 illustrates a flowchart depicting an exemplary method for recording a video by utilizing a video production system, in accordance with various embodiments.

With additional reference to FIG. 8, FIG. 8 depicts a method 800 for creating a video clip using the systems described herein (e.g., system 100 and its components). The video clip created through method 800 may be in response to an inquiry submitted by a merchant's customer, as discussed herein. Therefore, in various embodiments, merchant system 110 may receive the question or inquiry (step 802) submitted by the customer. Submitted inquiries may be transmitted to merchant system 110 (e.g., prompt system 114, or any other component comprised in merchant system 110). The submitted inquiries may be displayed on a GUI 604 used by the merchant to monitor, allocate, assign, address, and/or otherwise process the received inquiries. For example, GUI 604 may comprise an inquiry information box 650. Inquiry status box 650 may comprise a list of inquiries 655 received my merchant system 110. Each inquiry 655 may comprise characteristics associated therewith, which may indicate, for example, the brand, product, date, and/or status of the inquiry. As shown in GUI 604 of FIG. 6, the product 658 associated with each inquiry, and the status 659 of each inquiry, is shown in inquiry information box 650. The status 659 of each inquiry may indicate whether the inquiry has been assigned to someone to respond to the inquiry (or whether it has not yet been assigned), whether the inquiry is complete (i.e., whether there is an answer or response for the associated inquiry), whether the response to the inquiry is in progress, or any other status indicator for the respective inquiry.

In various embodiments, a user of system 100 and/or merchant system 110 may search for an inquiry or inquiries having certain characteristics (e.g., for a certain product or brand, or inquiries having certain statuses), for example, by search a term or phrase in search box 652. A user may also select a certain characteristic from search menu 653. Search menu 653 may be a dropdown menu allowing selection of certain statuses, products, brands, and/or the like. For example, a user may want to find all unassigned inquiries, so the user may select "unassigned" from the search menu 653. In response, all inquiries having "unassigned" statuses may be displayed in inquiry information box 650 (and inquiries having other statuses may be removed from view).

In various embodiments, GUI 604 may comprise an edit inquiry box 670, which may allow an inquiry to be edited. Edit inquiry box 670 may appear in response to the user selecting an inquiry (e.g., from inquiry information box 650). Edit inquiry box 670 may allow the user to edit the inquiry or characteristics associated with the inquiry. For example, if the user wants to edit the wording of the inquiry, the user may do so in inquiry edit box 672. The wording or text of the selected inquiry may appear in inquiry edit box 672, and the user can edit such wording or text therein. If the user desires to edit the product associated with an inquiry, the user may type in a product into product edit box 674, or select a product from a dropdown menu offered through product edit box 674. The user may edit the status of an inquiry in status edit box 676 in a similar manner. The user may assign an inquiry to a responder through assignee edit box 678 (e.g., by typing in a responder or selecting a responder from a dropdown menu offered through assignee edit box 678). In various embodiments, system 100 (e.g., via merchant system 110 and/or prompt system 114) may edit the inquiry and/or its associated characteristics automatically based on the data associated with the inquiry. For example, if an inquiry is received from a certain product webpage, the system may automatically associate that product with the inquiry. Or, if the inquiry may apply to multiple products, the system may edit or add a product with which the inquiry is associated. As another example, a video response to an inquiry may be uploaded and received by the system. In response, the system may automatically update the status of the inquiry from "unanswered" to "complete" or "answered." As another example, if there is a certain responder associated with a certain product or brand, the system may automatically assign any such inquiries associated with such a product or brand to the designated responder (and then system may automatically update the inquiry's status to "assigned").

Proceeding with method 800 to facilitate creating a video, the inquiry received by merchant system 110 may be assigned (step 804) to a responder, as discussed above. For example, the received inquiry may be assigned to a designated employee or associate of the merchant who is trained to respond to such inquiries (e.g., such as an expert on the product or other subject matter of the inquiry).

In various embodiments, a content prompt may be generated based on the inquiry received (step 806). For example, in various embodiments, the system (e.g., merchant server 110 and/or prompt system 114) may automatically create a content prompt including at least a portion of the same text or content as the received inquiry. The content prompt may have additional content or text added to that received in the inquiry, or a portion of the inquiry may be removed. In various embodiments, the system may be configured to recognize certain parts of an inquiry (such as question words like "how," "where," "what," etc.), and may be able to create an instructional content prompt based on the inquiry, rather than simply copying the inquiry (or question therein). For example, based on a received inquiry reciting a question like, "how to disassemble the device?", the system may create an instructional content prompt reading, "explain disassembly," or the like. That way, the responder in the video to answer the inquiry may create, or facilitate the creation of, a response video by simply demonstrating the instructional content prompt (i.e., following the instructions therein), rather than reading the question and thinking how to respond. In various embodiments, a user of merchant system 110 and/or prompt system 114 may manually create the content prompt based on the received inquiry (e.g., by entering the question or instructions into the system to create the content prompt).

Figure 7:
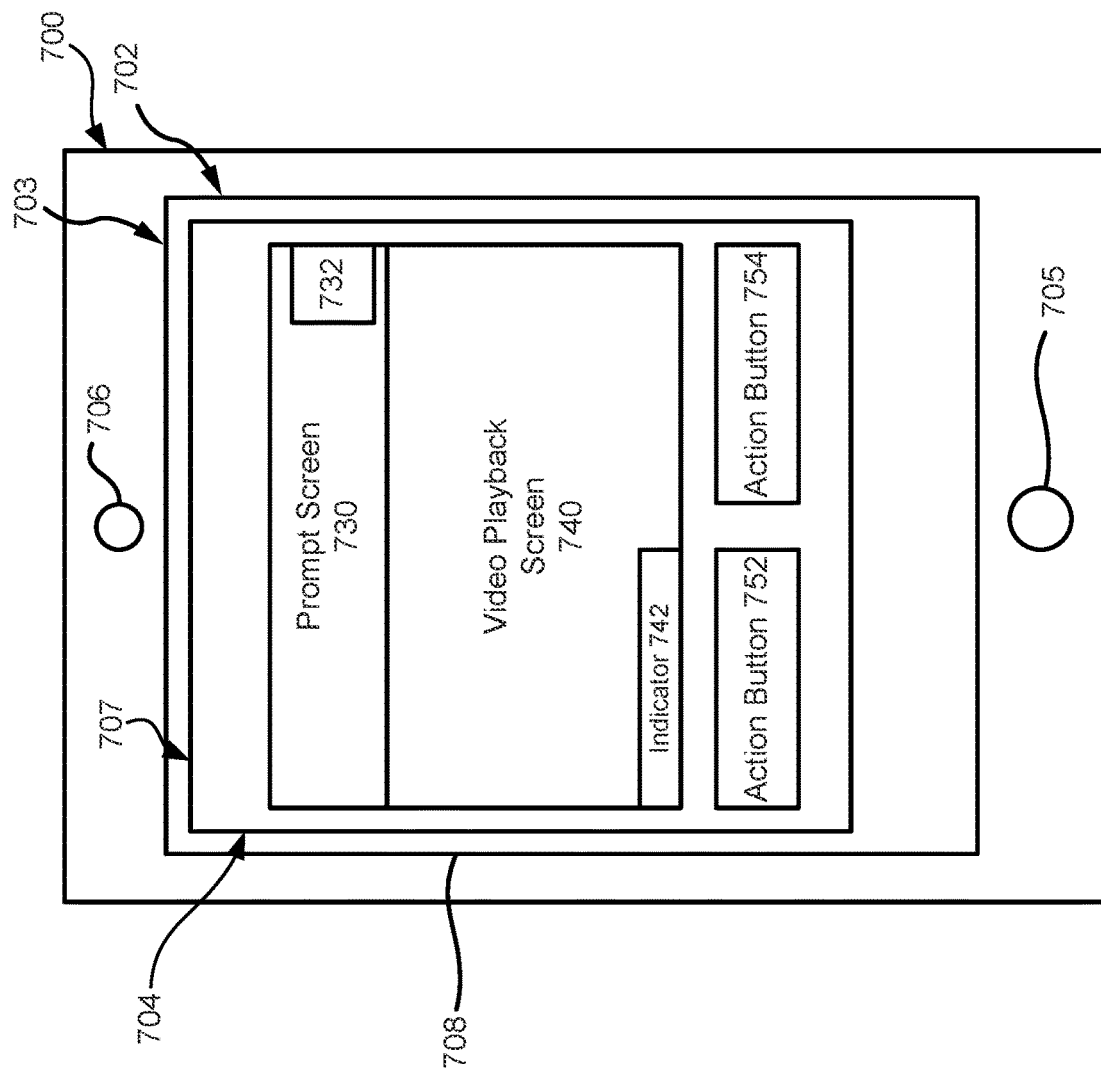
FIG. 7 illustrates an exemplary display screen on a web client depicting a GUI provided by a video production system, in accordance with various embodiments.

When the responder is ready to utilize system 100 to create a video to respond an assigned inquiry, system 100 and/or processor 112 may display a GUI (e.g., GUI 116) on display screen 122 of web client 120 (step 808). (This step 808 may be similar to step 302 in method 300 of FIG. 3, and therefore, the discussion associated with step 302 may apply to step 808). Accordingly, the GUI displayed may be GUI 204 shown in FIG. 2, or may be similar to GUI 204 or comprise one or more components of GUI 204. For example, with additional reference to FIG. 7, the GUI displayed to create a video may be GUI 704. GUI 704 may be displayed on display screen 702 of web client 700 (e.g., a smart phone or tablet having a home button 705 and a camera 706). As depicted in FIG. 7, GUI 704 may comprise or take up a portion of display screen 702. In various embodiments, GUI 704 may be defined by a clear boundary (e.g., boundary 708 comprising a top edge 707), or the GUI for creating a video clip may not have defined boundaries, but may be the portion of the display screen occupied by a prompt screen (e.g., prompt screen 730), a video playback screen (e.g., video playback screen 740), and/or other aspects or components for creating a video. As shown in FIG. 7, GUI 704 may comprise a prompt screen 730 (similar to prompt screen 230 in FIG. 2, and the discussion related thereto), and/or a video playback screen 740 (similar to video playback screen 240 in FIG. 2, and the discussion related thereto).

In various embodiments, prompt screen 730 may be configured to display a content prompt configured to solicit a certain reaction and/or information from the user during recording of a video (or video clip). (Prompt screen 730 may be similar to prompt screen 230, and therefore, the discussion associated with prompt screen 230 may also apply to prompt screen 730). A content prompt may be displayed on prompt screen 730 before, during, and/or after recording of the respective video. The content prompt displayed on prompt screen 730 may be the content prompt generated based on the received inquiry. In various embodiments, prompt screen 730 may be a discrete component of GUI 704, or prompt screen 730 may simply be a portion of GUI 704 without clearly defined boundaries. In various embodiments, the prompt screen may be proximate and/or adjacent to the top edge of the GUI (e.g., top edge 707) (or the edge most proximate a camera). In various embodiments, the prompt screen may be the portion or component of the GUI that is most proximate the top edge of the GUI (or the edge most proximate a camera). For example, prompt screen 730 is the component most proximate to top edge 707 of GUI 704, which is most proximate camera 706. In various embodiments, the prompt screen may be proximate and/or adjacent to the top edge of the display screen (or the edge most proximate a camera) (e.g., including the GUI being scrolled or moved in the screen to so position the GUI and/or prompt screen). In various embodiments, the prompt screen may be the portion or component of the GUI that is most proximate the top edge of the display screen (or the edge most proximate a camera). For example, prompt screen 730 is the component most proximate to top edge 703 of display screen 702 (or the edge most proximate a camera). In various embodiments, the prompt screen may be moved within the GUI or the display screen to position the prompt screen as desired by the user (e.g., closer to the camera).

In various embodiments, to show the user what (visual) information is being captured via the camera, a video playback screen may be displayed (step 810). (Step 810 may be similar to step 306 in method 300, and therefore, the discussion associated with step 306 may apply to step 810). Video playback screen 740 may be prominent in GUI 204 for easy viewing by the user. In various embodiments, the video playback screen may be the most prominent or largest component or portion of the GUI (as shown in FIG. 7, video playback screen 740 is the largest portion or component of GUI 704). Video playback screen 740 may display the visual information being captured through camera 706 whether or not system 100 is recording. Additionally, video playback screen 740 may comprise indicator 742, which may display one or more aspects or characteristics of the information being captured through camera 706 (e.g., whether the information is being recorded or not, brightness level or other visual elements, the sound or volume level of audio information being captured by a microphone, the duration of the recording, or the like). (Video playback screen 740 may be similar to video playback screen 240, and therefore, the discussion associated with video playback screen 240 may also apply to video playback screen 740).

In various embodiments, the prompt screen may be more proximate a camera of the web client, a top edge of the GUI, a top edge of the display screen, an edge of the GUI most proximate the camera, and/or an edge of the display screen most proximate the camera, than the video playback screen. In various embodiments, the prompt screen may be disposed between the video playback screen and the camera of the web client, the top edge of the GUI, the top edge of the display screen, the edge of the GUI most proximate the camera, and/or the edge of the display screen most proximate the camera. For example, as shown in FIG. 7, prompt screen 730 is disposed between video playback screen 740 and top edge 707 of GUI 704, top edge 703 of display screen 702, and camera 706.

In various embodiments, the generated content prompt may be displayed on the prompt screen 730 (step 812). (Step 812 may be similar to step 308 in method 300, and therefore, the discussion associated with step 308 may apply to step 812). The content prompt may be displayed in content prompt screen 730 in response to the user or responder indicating to the system (e.g., via an input through an input device 145) a desire to create a video. The content prompt may be automatically displayed in content prompt screen 730 (e.g., in response to the user or responder selecting the content prompt or associated inquiry). The content prompt may be displayed in content prompt screen 730 before, during, and/or after recording of the associated video.

In various embodiments, GUI 704 may comprise a skip tool 732 (similar to skip tool 232 and the discussion associated therewith). If there are multiple content prompts and/or videos to record, the user may skip a content prompt displayed in prompt screen 730, or move to a different content prompt than that displayed in prompt screen 730, by selecting skip tool 732.

In various embodiments, a user may record a video (step 814) associated with the displayed content prompt and related inquiry. The recording may occur while the content prompt is displayed on prompt screen 730. (Step 814 may be similar to step 310 of method 300, and therefore, the discussion associated with step 310 may apply to step 814). The user may select a "record" button, such as one of action buttons 752, 754 on GUI 704, and/or press a physical button (e.g., the spacebar on a keyboard, or a button on a smart phone or tablet) to begin recording. (Action buttons 752, 754 may be similar to action buttons 252, 254 on GUI 204, and thus, the discussion associated with action buttons 252, 254 may apply to action buttons 752, 754). In response, processor 112 may receive the input from the user to record and command video recording system 140 to do so. Video recording system 140 may begin recording the visual data captured through camera 706 (and/or audio data captured through a microphone). In various embodiments, the user may select a "pause" or "stop" recording button (e.g., through action buttons 752, 754). An action button may also comprise, for example, a "redo" button to delete the current recorded video and start again, or a "finish" or "upload" button to indicate to processor 112 that the recording of the video is complete (i.e., the user is satisfied with the video). The user may record the video while providing content solicited from content prompt displayed in prompt screen 730 (e.g., an answer or response to the associated inquiry).

In various embodiments, in response to the recording of the video being complete, which may include the user being satisfied with the video and/or requesting to save or upload the video (as indicated to processor 112, for example, by the selection of a "finish" or "save" button or the like), processor 112 may associate the video with the received inquiry (step 816), and/or the associated content prompt. That is, whichever inquiry(s) is associated with the content prompt that was displayed in prompt screen 730 during the recording of a video will be associated with the completed video. (Step 816 may be similar to step 312 of method 300, and therefore, the discussion associated with step 312 may apply to step 816). Associating the video with the inquiry and/or content prompt may comprise processor 112 attaching or adding an inquiry identifier or content prompt identifier associated with received inquiry to the video, or otherwise marking the video with the inquiry identifier.

In various embodiments, in response to the completion of recording a video, and/or associating the video with the respective inquiry or content prompt (e.g., by an inquiry identifier or content prompt identifier), video recording system 140 may transmit the video to video server 130 to be stored in video database 132 (step 818). (Step 818 may be similar to step 324 of method 300, and therefore, the discussion associated with step 324 may apply to step 818). The transmission to and storage by video server 130 of the video may be in response to the user selecting a "complete," "save," "upload," or the like action button, indicating that the user is satisfied with the video, and wishes to save it.

In various embodiments, in response to completing a video, associating the video with the related inquiry, and/or storing the video, the video may be presented (step 820) to the user or customer for viewing (e.g., on a webpage for the product associated with the inquiry). For example, in response to a user or customer selecting the associated inquiry 555 from inquiry box 550 in GUI 504A (FIG. 5), the created video may appear and be played for viewing in video screen 540. That is, the video may be retrieved (e.g., from video database 132) and played for the user (step 822). Additionally, as described herein, system 100 may allow the user to share a created video on social media (e.g., to explain a product or respond to some other inquiry).

In various embodiments, if there are multiple topics or segments needed to record a video answering a submitted inquiry, there may be multiple content prompts (e.g., generated from one or more received inquiries). A video clip may be recorded for each content prompt, and then combined into a completed video. Such a process may be completed in accordance with method 300 of FIG. 3 and the associated discussion. It should be noted that, despite GUI 204 being discussed in relation to methods 300 and 400, and GUI 704 being discussed in relation to method 800, GUI 204 may be utilized with method 800, and GUI 704 may be utilized with methods 300 and 400, or any variations of GUIs 204 and 704 may be used (e.g., having different combinations and/or arrangements of components within the GUIs, or the like).

In light of the foregoing discussion, a user of system 100 (e.g., a customer of a merchant) may be able to submit inquiries (e.g., ask questions) about a product, for example, and the inquiry can be answered by a responder (e.g., who is associated with the merchant) creating a response video using the system and methods described herein. In various embodiments, the responder creating a video responding to an inquiry may be another user or customer (e.g., who may select the desired inquiry and then provide an input to bring up a GUI (e.g., GUI 204 or 704) to record the responding video). Accordingly, informational videos may be continually created and available to better serve customers and thoroughly answer their questions.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a content prompt (ii) an order marker, and/or (iii) a video clip. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

As used herein, "transmit" may include sending electronic data from one system component to another over a network connection. Additionally, as used herein, "data" may include encompassing information such as commands, queries, files, data for storage, and the like in digital or any other form.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   displaying, by a processor, a graphical user interface (GUI) on a display screen of a web client, wherein the GUI comprises a plurality of features, including a prompt screen;
   displaying, by the processor, a first content prompt on the prompt screen comprised in the GUI, wherein the prompt screen is a feature of the plurality of features that is disposed on the GUI most proximate to an edge of the GUI;
   displaying, by the processor, a video playback screen, which is separate from the prompt screen, of the plurality of features displaying visual information in real time captured through a camera, wherein the prompt screen is disposed in the GUI between the edge of the GUI and the video playback screen;
   recording, by the processor, a first video clip during the displaying the first content prompt, wherein the first content prompt comprises at least one of a first text or a first image configured to solicit at least one of a first desired reaction or a first desired information from a user during the recording of the first video clip;

displaying, by the processor, a second content prompt on the prompt screen in response to the recording the first video clip being completed;

recording, by the processor, a second video clip during the displaying the second content prompt, wherein the second content prompt comprises at least one of a second text or a second image configured to solicit at least one of a second desired reaction or a second desired information from the user during the recording of the second video clip; and concatenating, by the processor, the first video clip and the second video clip into a video.

2. The method of claim 1, wherein the displaying the second content prompt automatically occurs in response to the recording the first video clip being completed.

3. The method of claim 1, further comprising:

associating, by the processor, the first video clip with the first content prompt in response to the recording the first video clip; and associating, by the processor, the second video clip with the second content prompt in response to the recording the second video clip.

4. The method of claim 3, wherein the first content prompt comprises a first order marker, and the second content prompt comprises a second order marker, wherein the first order marker and the second order marker indicate a concatenating order in which the first video clip and the second video clip are concatenated as part of the concatenating the first video clip and the second video clip into the video, wherein the method further comprises displaying, by the processor, a prompt guide on the GUI, wherein displaying the prompt guide comprises displaying the first content prompt and the second content prompt within the prompt guide according to a display order dictated by the first order marker and the second order marker.

5. The method of claim 4, wherein the concatenating order is the same as the display order.

6. The method of claim 4, wherein the displaying the second content prompt automatically occurs in response to the recording the first video clip being completed, wherein the second order marker is later in at least one of the concatenating order or the display order than the first order marker.

7. The method of claim 5, further comprising:

marking, by the processor, the first content prompt displayed in the prompt guide with a first recorded marker in response to the recording the first video clip being completed; and marking, by the processor, the second content prompt displayed in the prompt guide with a second recorded marker in response to the recording the second video clip being completed.

8. The method of claim 5, wherein the displaying the second content prompt in the prompt screen is in response to receiving, by the processor, a selection of the second content prompt displayed in the prompt guide by a user.

9. The method of claim 1, wherein the recording the first video clip begins after the displaying the first content prompt begins, and wherein the recording the second video clip begins after the displaying the second content prompt begins.

10. The method of claim 1, further comprising removing, by the processor, the first content prompt from the prompt screen before the displaying the second content prompt on the prompt screen, such that the second content prompt replaces the first content prompt on the prompt screen.

11. A system, comprising: a processor; and a tangible, non-transitory memory configured to communicate with the processor, and the tangible, non-transitory memory having instructions stored thereon that, in response to execution by the processor, cause the processor to perform operations comprising: displaying, by the processor, a graphical user interface (GUI) for recording a video on a display screen of a web client, wherein the GUI comprises a plurality of features, including a prompt screen; displaying, by the processor, a content prompt on the prompt screen comprised in the GUI, wherein the prompt screen is disposed on the GUI proximate to an edge of the GUI; displaying, by the processor, a video playback screen, which is separate from the prompt screen, of the plurality of features displaying visual information in real time captured through a camera; and recording, by the processor, a video clip during the displaying the content prompt, wherein the content prompt comprises at least one of a text or an image configured to solicit at least one of a desired reaction or a desired information from a user during the recording of the video clip.

12. The system of claim 11, wherein the operations further comprise receiving, by the processor, an inquiry from a customer user prior to the displaying the GUI for recording a video.

13. The system of claim 12, wherein the operations further comprise generating, by the processor, the content prompt based on the inquiry.

14. The system of claim 12, wherein the operations further comprise associating, by the processor, the inquiry with the video clip.

15. The system of claim 14, wherein the operations further comprise displaying, by the processor, the inquiry on a merchant GUI.

16. The system of claim 15, wherein the operations further comprise: receiving, by the processor, a selection of the inquiry; and playing, by the processor, the video clip on the merchant GUI in response to the selection of the inquiry.

17. The system of claim 11, wherein the operations further comprise moving, by the processor, the GUI within the display screen.

18. The system of claim 11, wherein the prompt screen is more proximate to the edge of the GUI than the video playback screen.

19. The system of claim 18, wherein the prompt screen is disposed between the edge of the GUI and the video playback screen.

20. The system of claim 18, wherein the prompt screen is a feature of the plurality of features that is most proximate the edge of the GUI.

* * * * *